July 21, 1953 F. M. CARROLL 2,645,994
RECORD CARD PUNCHING AND NUMBERING MACHINE
Filed May 12, 1949 33 Sheets-Sheet 4
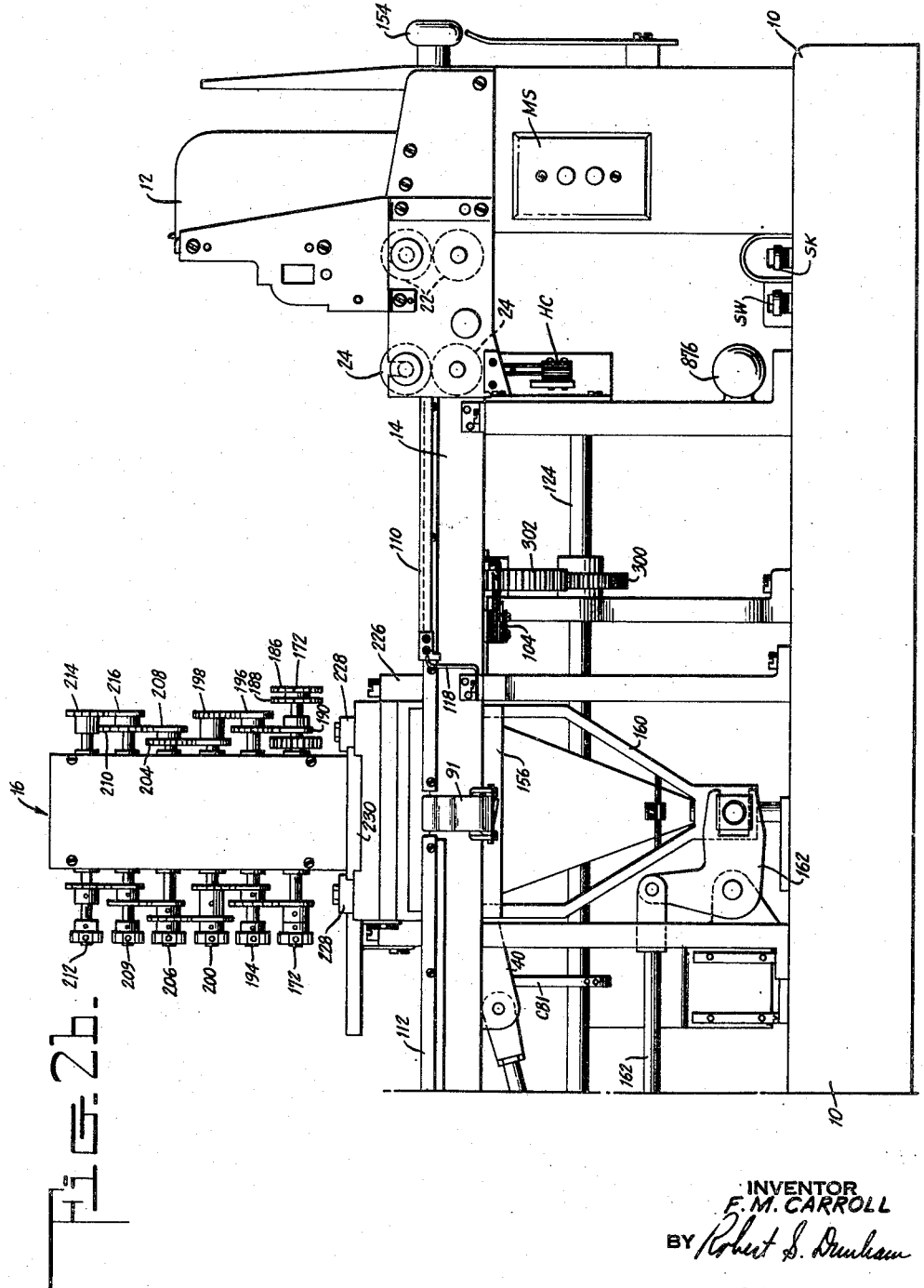
INVENTOR
F. M. CARROLL
BY Robert S. Dunham
ATTORNEY

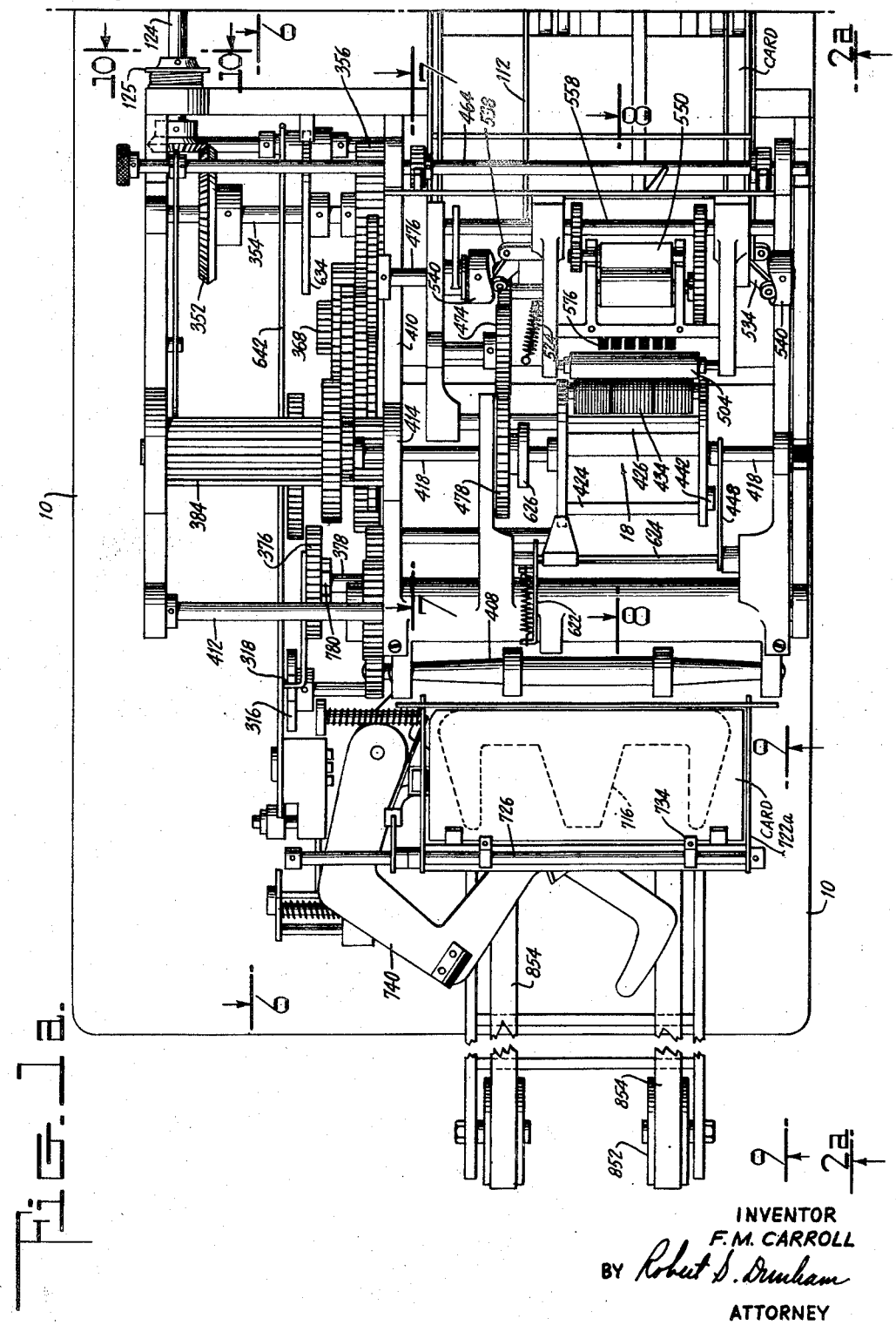

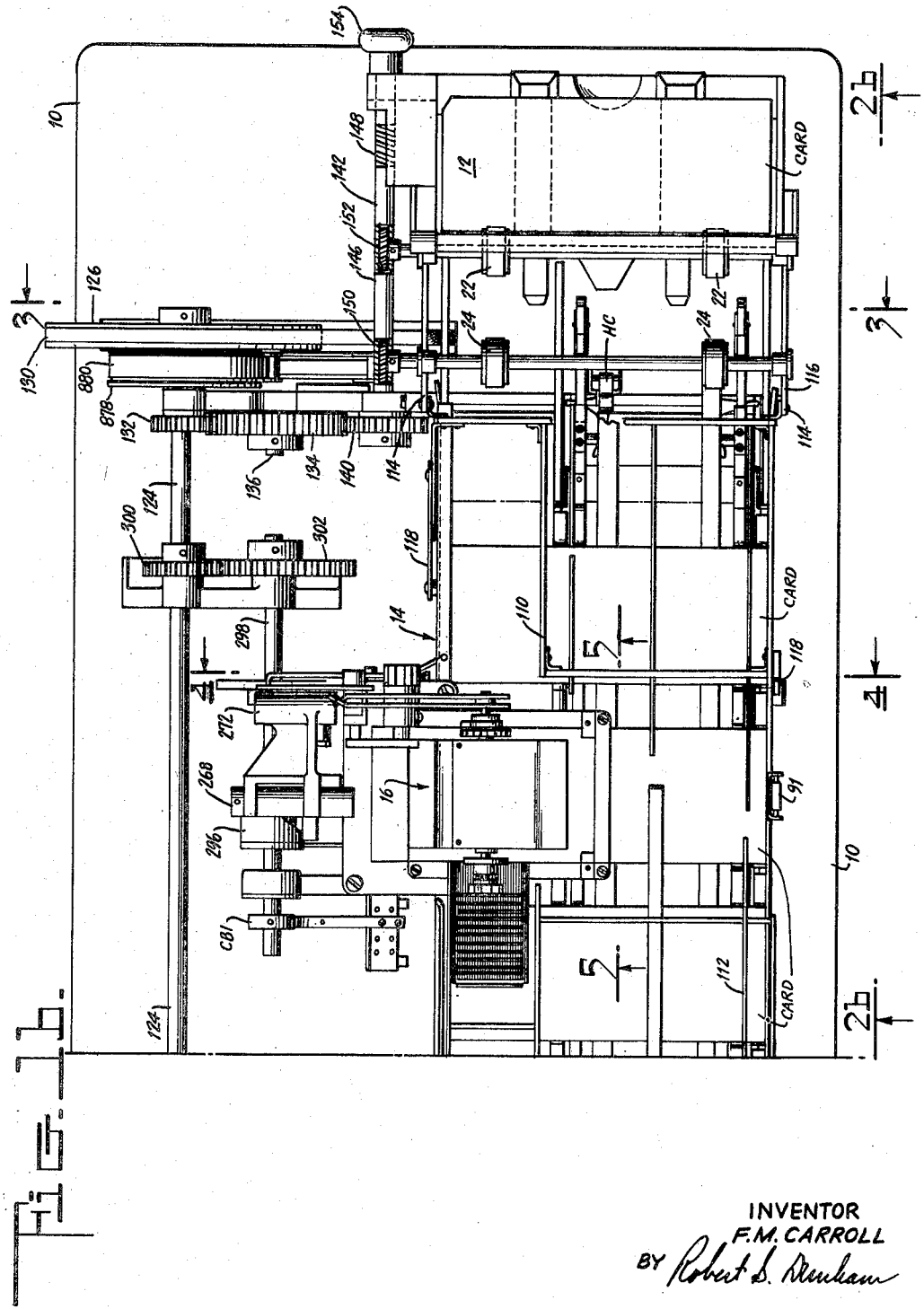

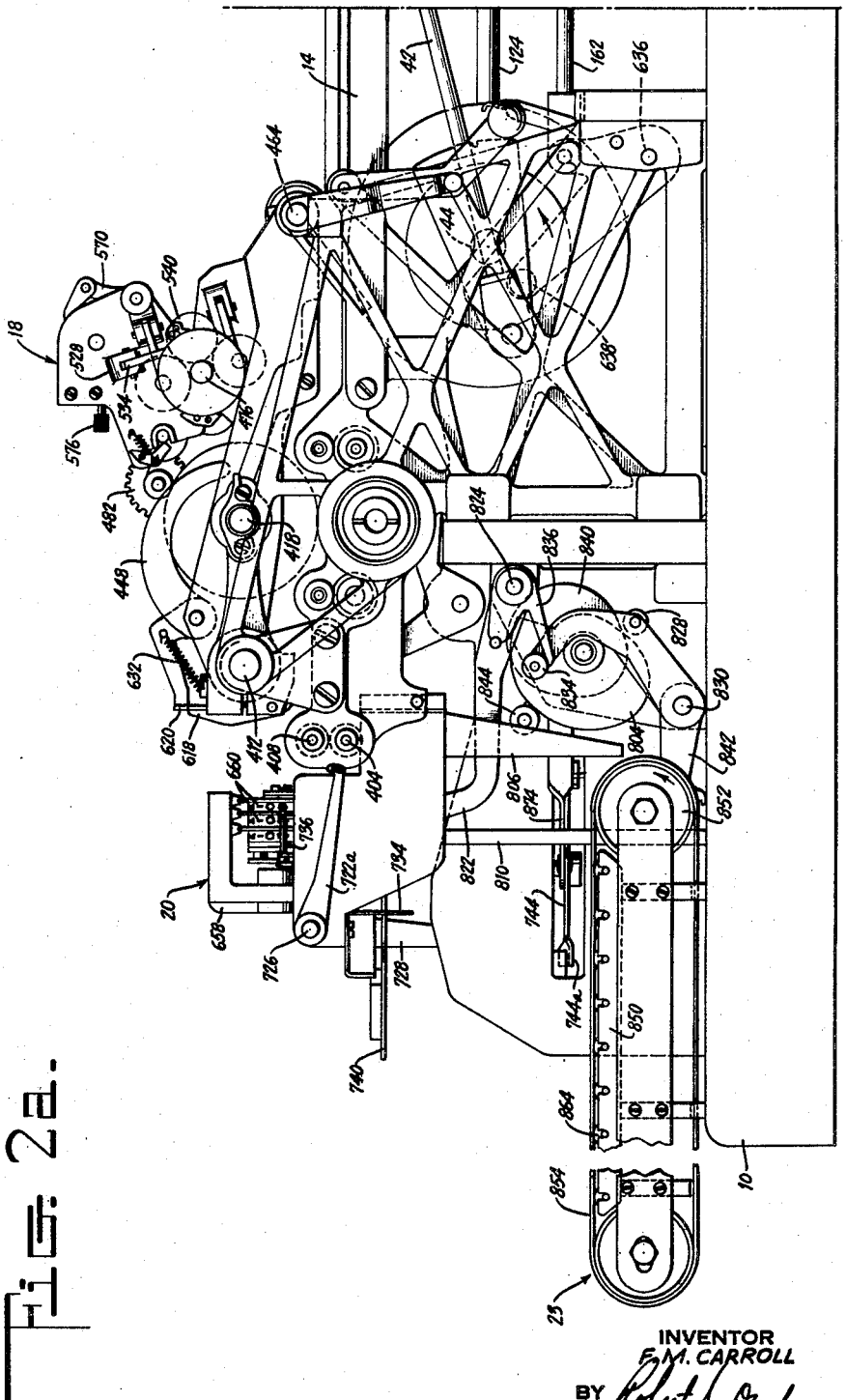

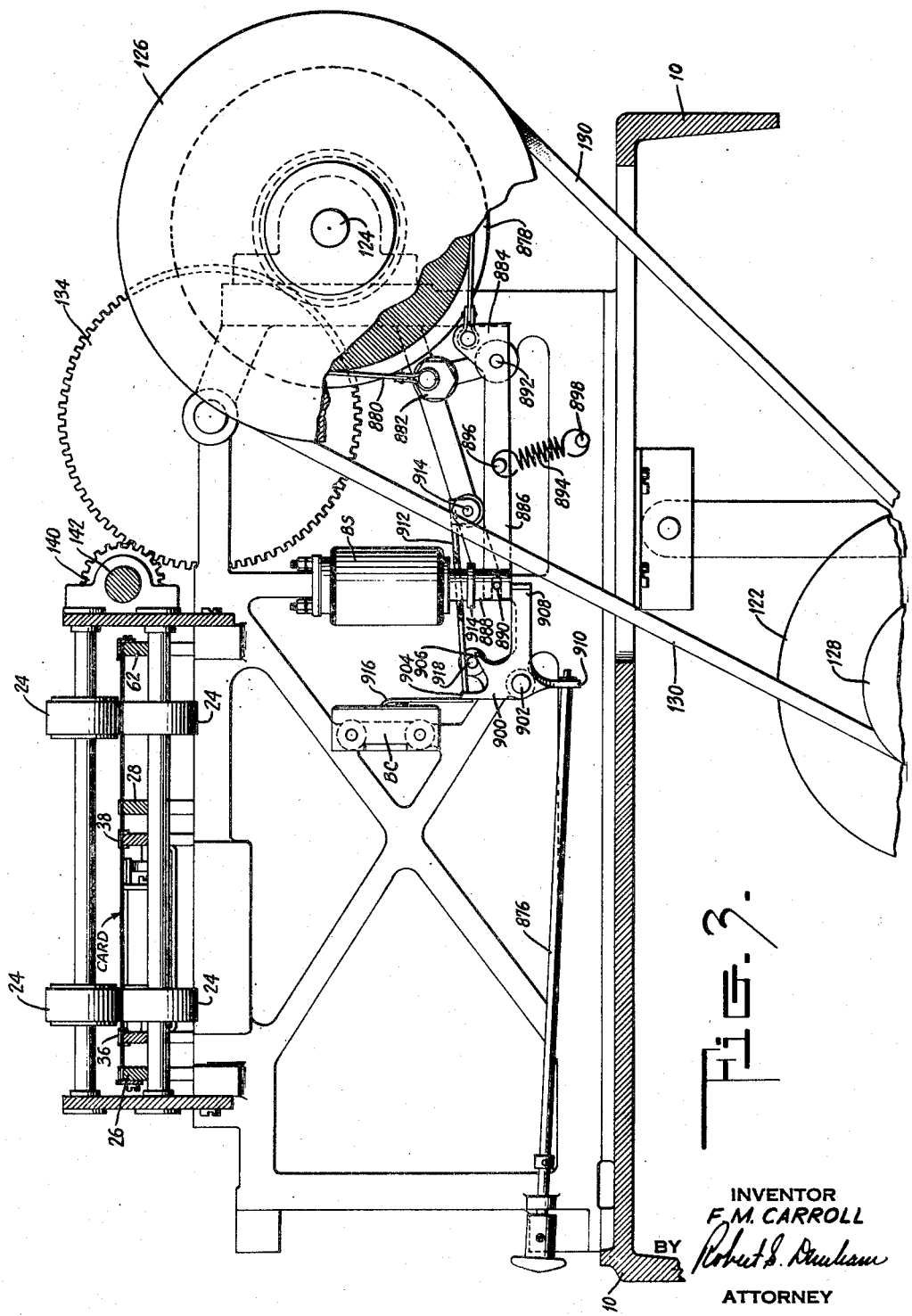

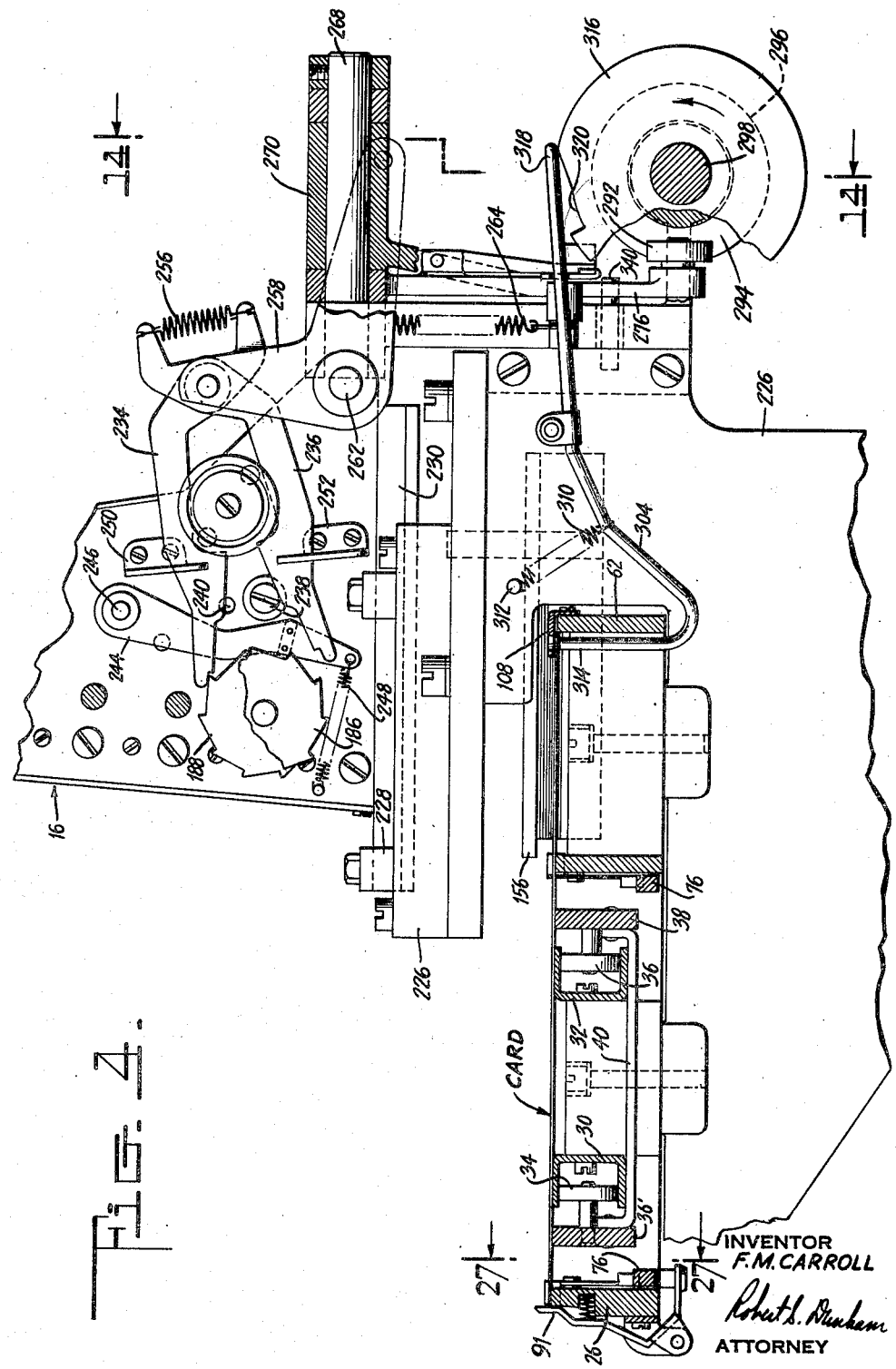

July 21, 1953  F. M. CARROLL  2,645,994
RECORD CARD PUNCHING AND NUMBERING MACHINE
Filed May 12, 1949  33 Sheets-Sheet 8

INVENTOR
F. M. CARROLL
BY
ATTORNEY

July 21, 1953 F. M. CARROLL 2,645,994
RECORD CARD PUNCHING AND NUMBERING MACHINE
Filed May 12, 1949 33 Sheets-Sheet 9

INVENTOR
F. M. CARROLL
BY Robert S. Dunham
ATTORNEY

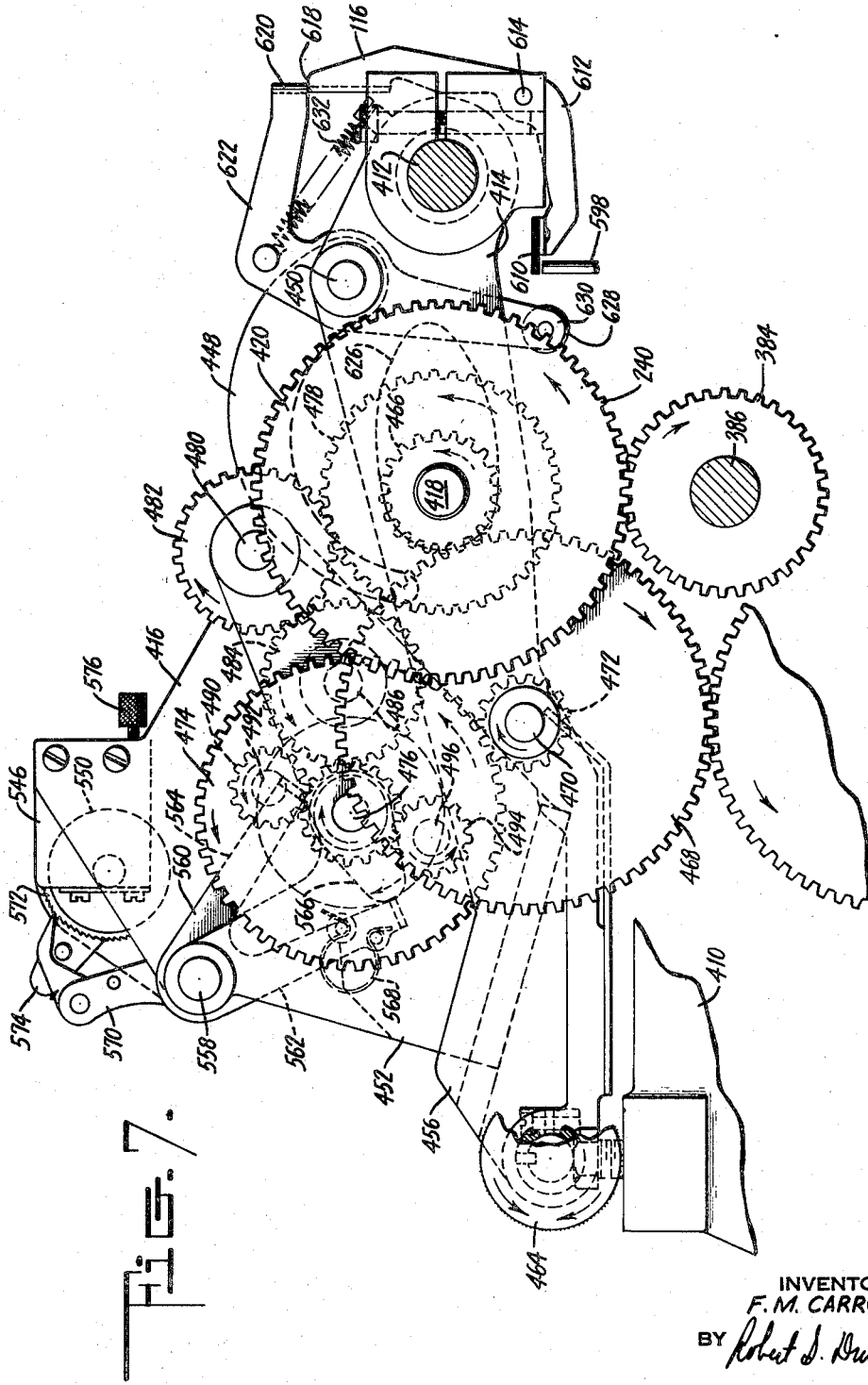

July 21, 1953 F. M. CARROLL 2,645,994
RECORD CARD PUNCHING AND NUMBERING MACHINE
Filed May 12, 1949 33 Sheets-Sheet 12
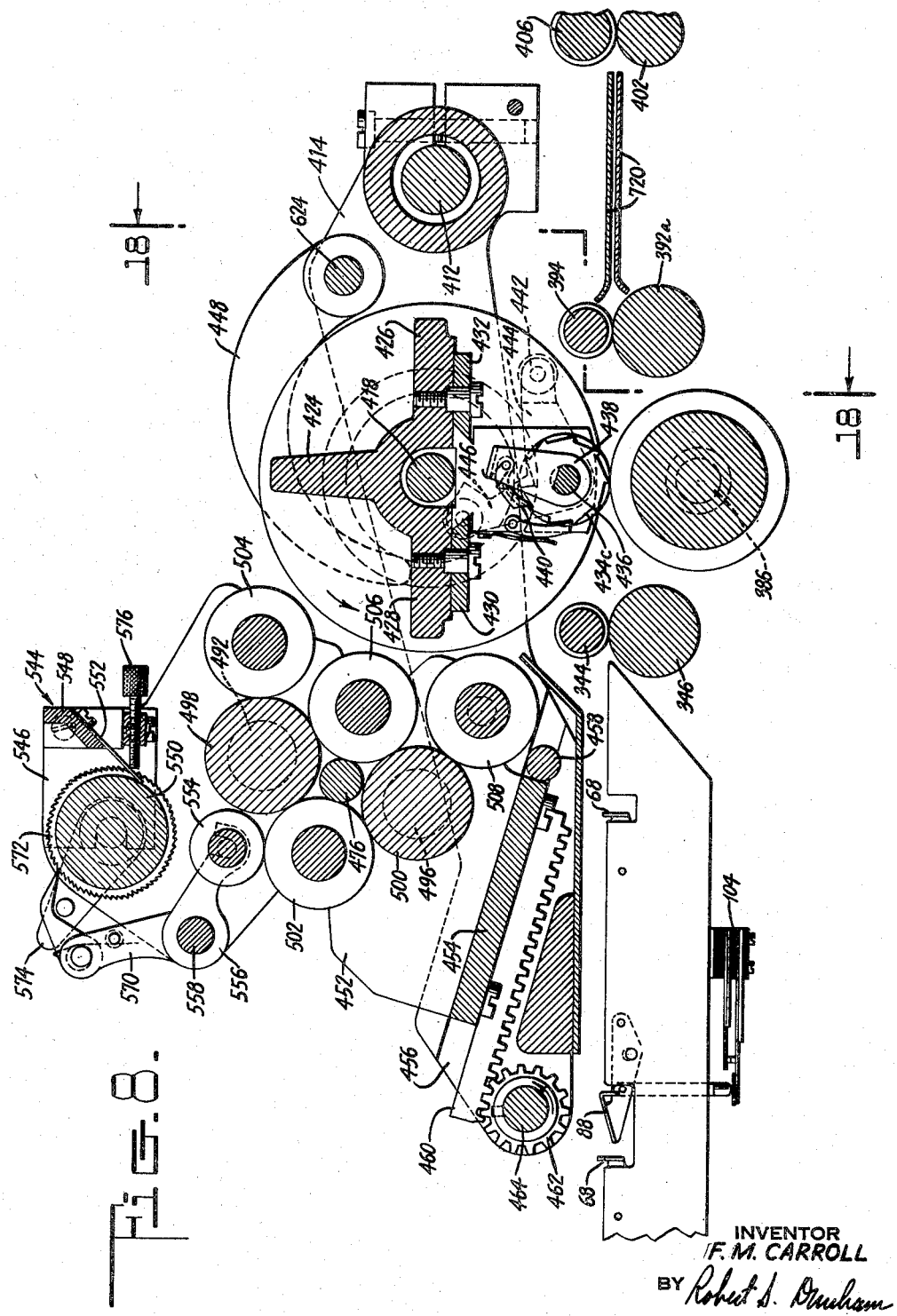
INVENTOR
F. M. CARROLL
BY Robert S. Dunham
ATTORNEY July 21, 1953  F. M. CARROLL  2,645,994
RECORD CARD PUNCHING AND NUMBERING MACHINE
Filed May 12, 1949  33 Sheets-Sheet 13

INVENTOR
F. M. CARROLL
BY Robert S. Dunham
ATTORNEY

July 21, 1953  F. M. CARROLL  2,645,994
RECORD CARD PUNCHING AND NUMBERING MACHINE
Filed May 12, 1949   33 Sheets-Sheet 14

INVENTOR
F. M. CARROLL
BY Robert L. Dunham
ATTORNEY

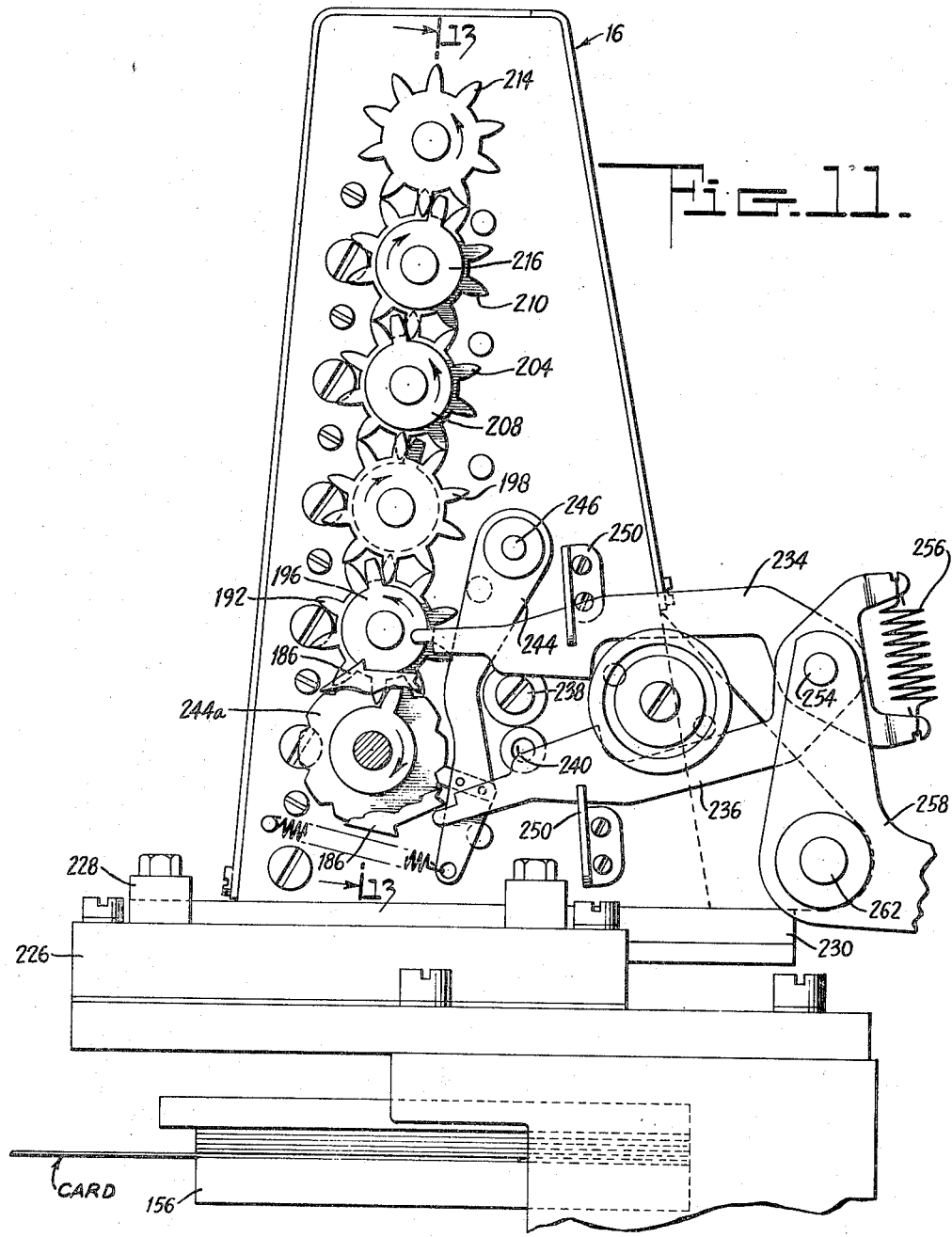

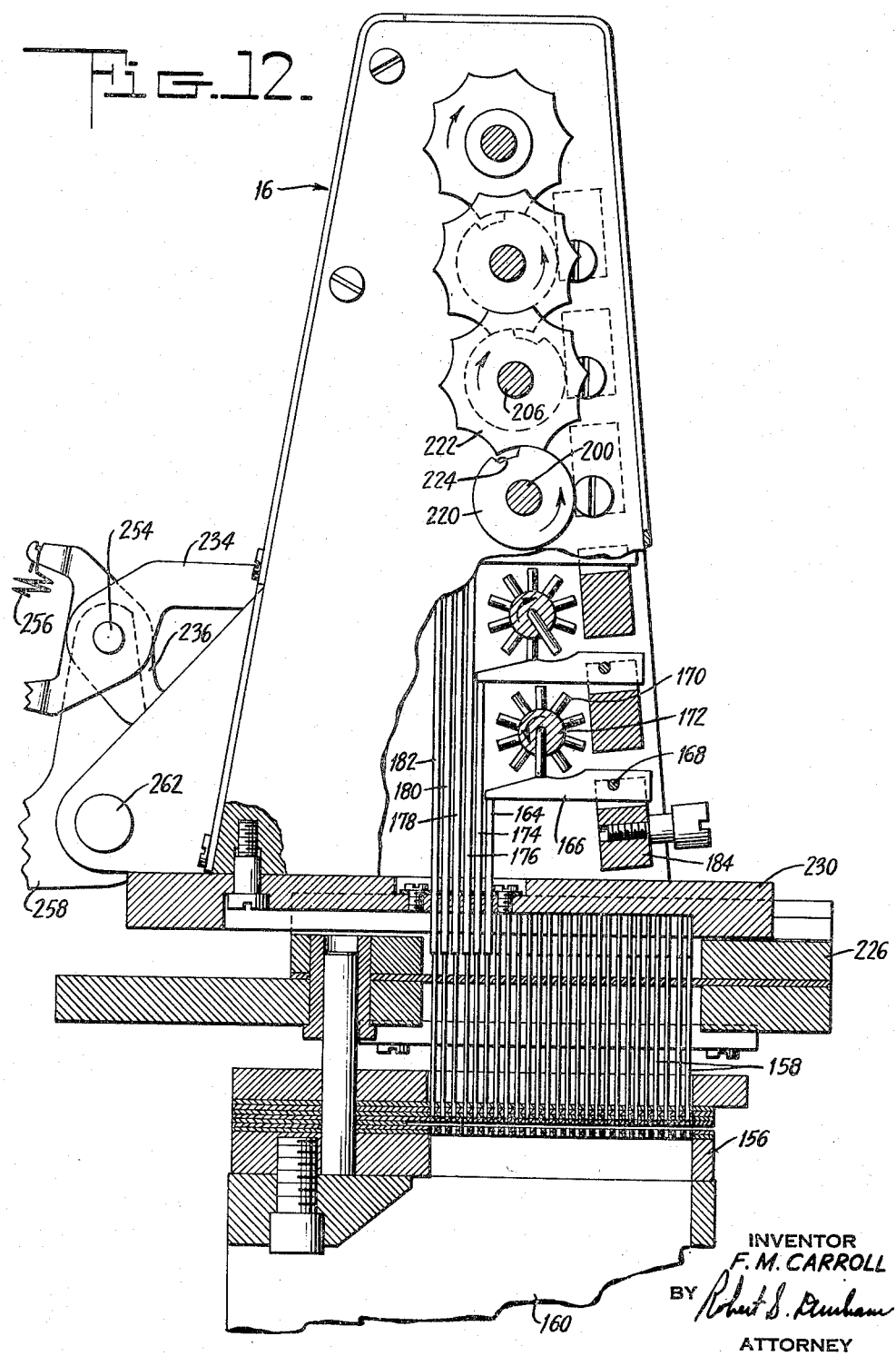

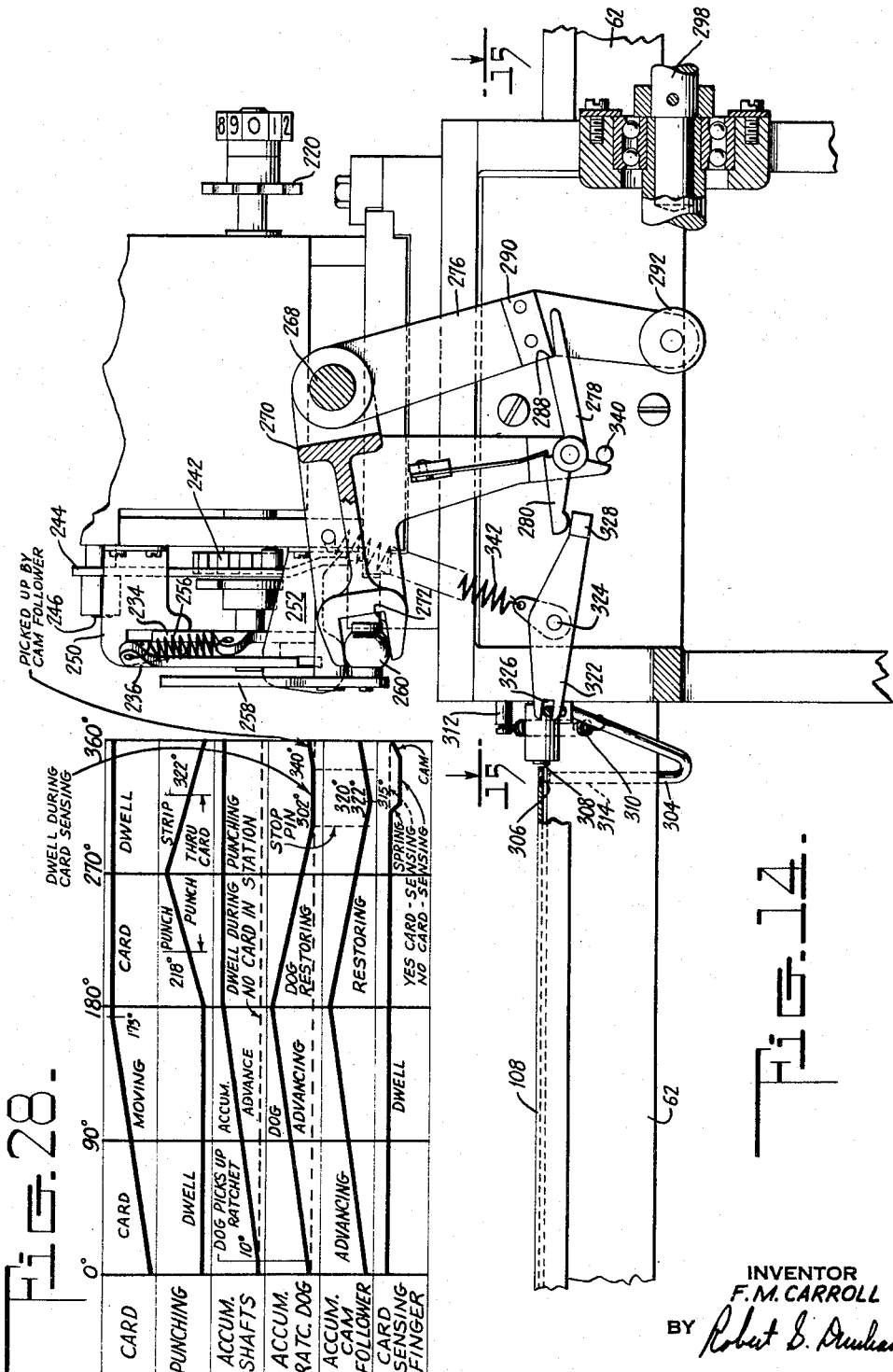

July 21, 1953 F. M. CARROLL 2,645,994
RECORD CARD PUNCHING AND NUMBERING MACHINE
Filed May 12, 1949 33 Sheets-Sheet 18

INVENTOR
F. M. CARROLL
BY Robert S. Dunham
ATTORNEY

July 21, 1953 F. M. CARROLL 2,645,994
RECORD CARD PUNCHING AND NUMBERING MACHINE
Filed May 12, 1949 33 Sheets-Sheet 19
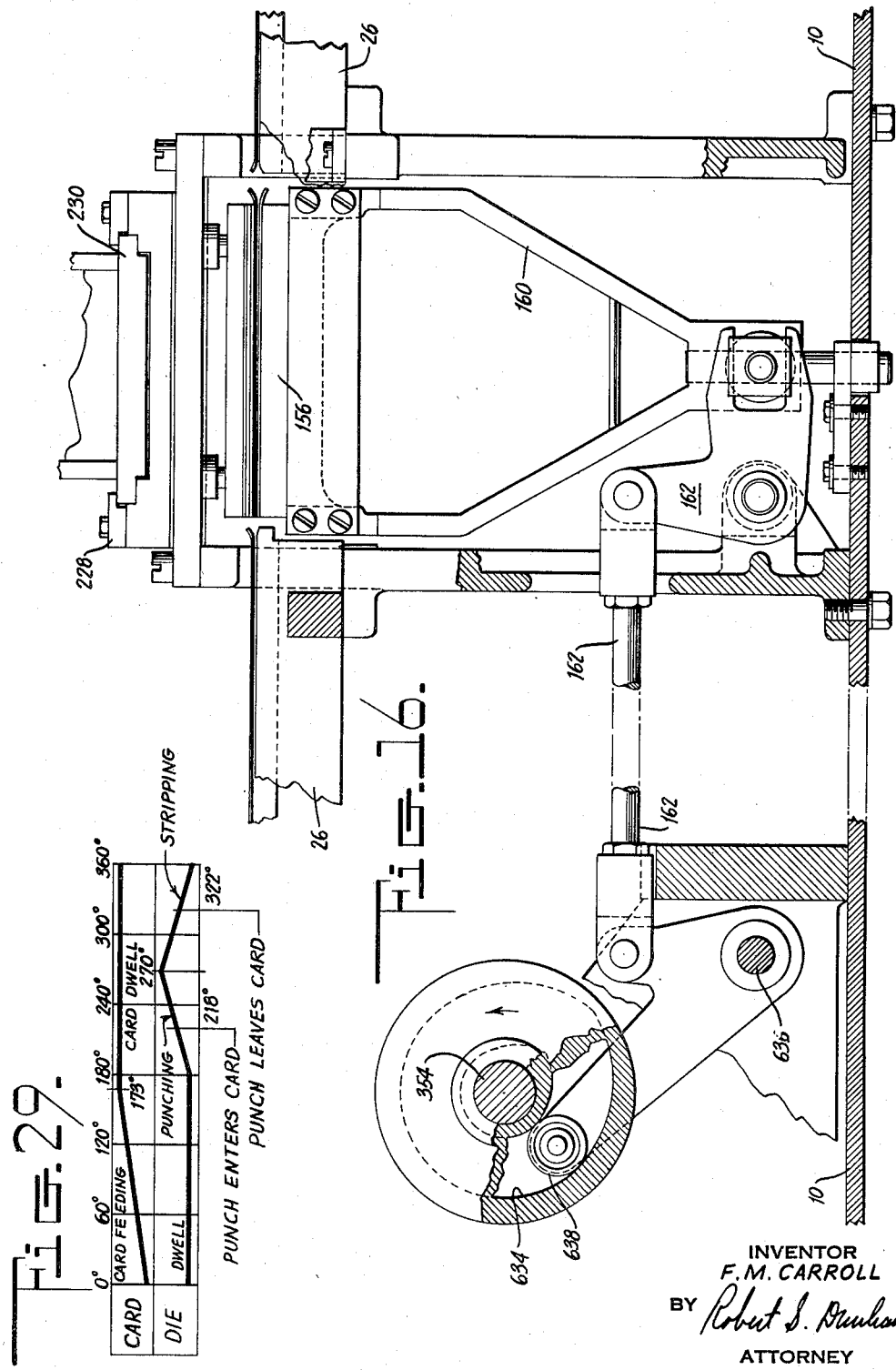
INVENTOR
F. M. CARROLL
BY Robert S. Dunham
ATTORNEY

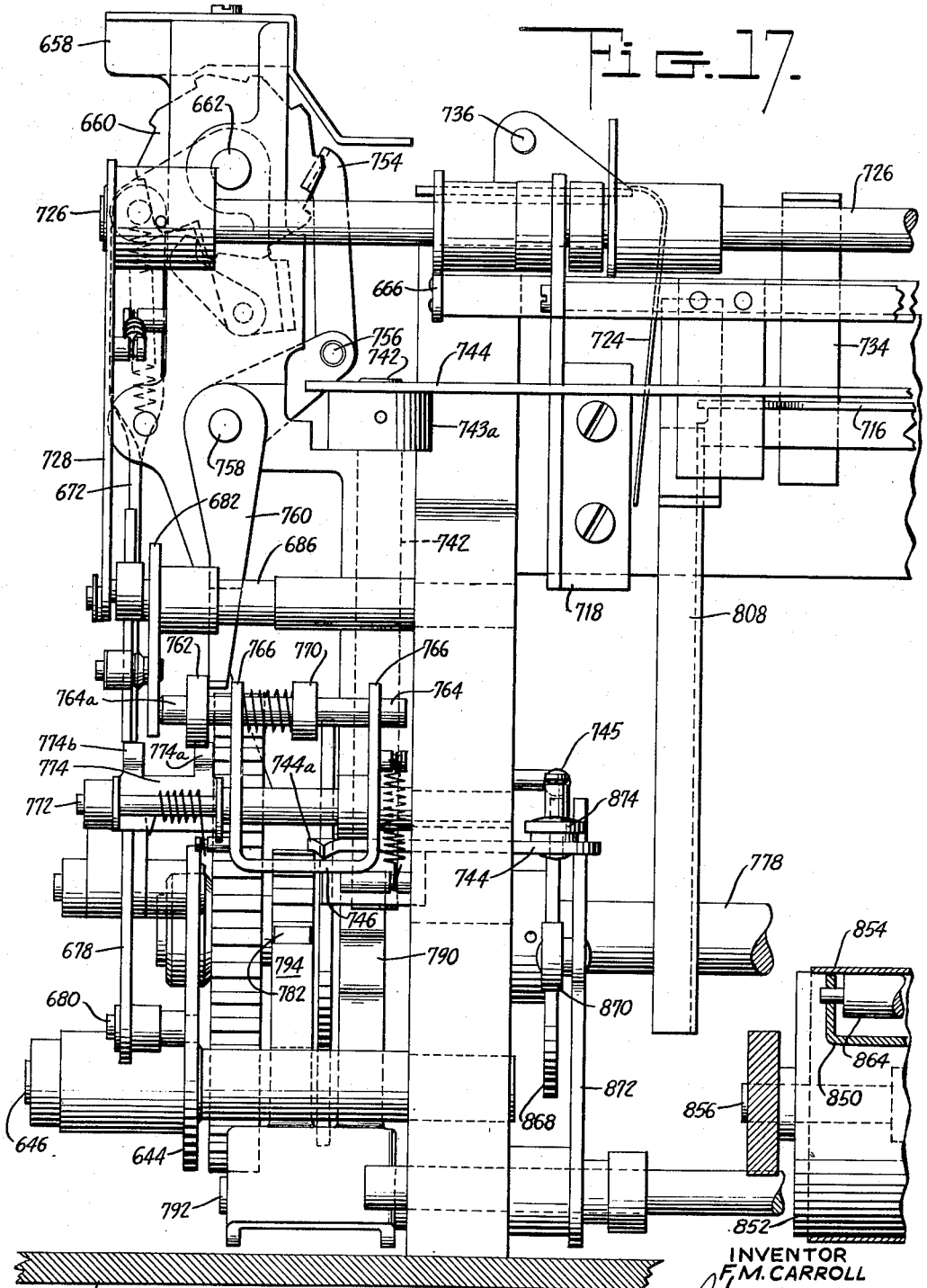

July 21, 1953  F. M. CARROLL  2,645,994
RECORD CARD PUNCHING AND NUMBERING MACHINE
Filed May 12, 1949  33 Sheets-Sheet 21

INVENTOR
F. M. CARROLL
BY
ATTORNEY

July 21, 1953 F. M. CARROLL 2,645,994
RECORD CARD PUNCHING AND NUMBERING MACHINE
Filed May 12, 1949 33 Sheets-Sheet 22

INVENTOR
F. M. CARROLL
BY *Robert S. Dunham*
ATTORNEY

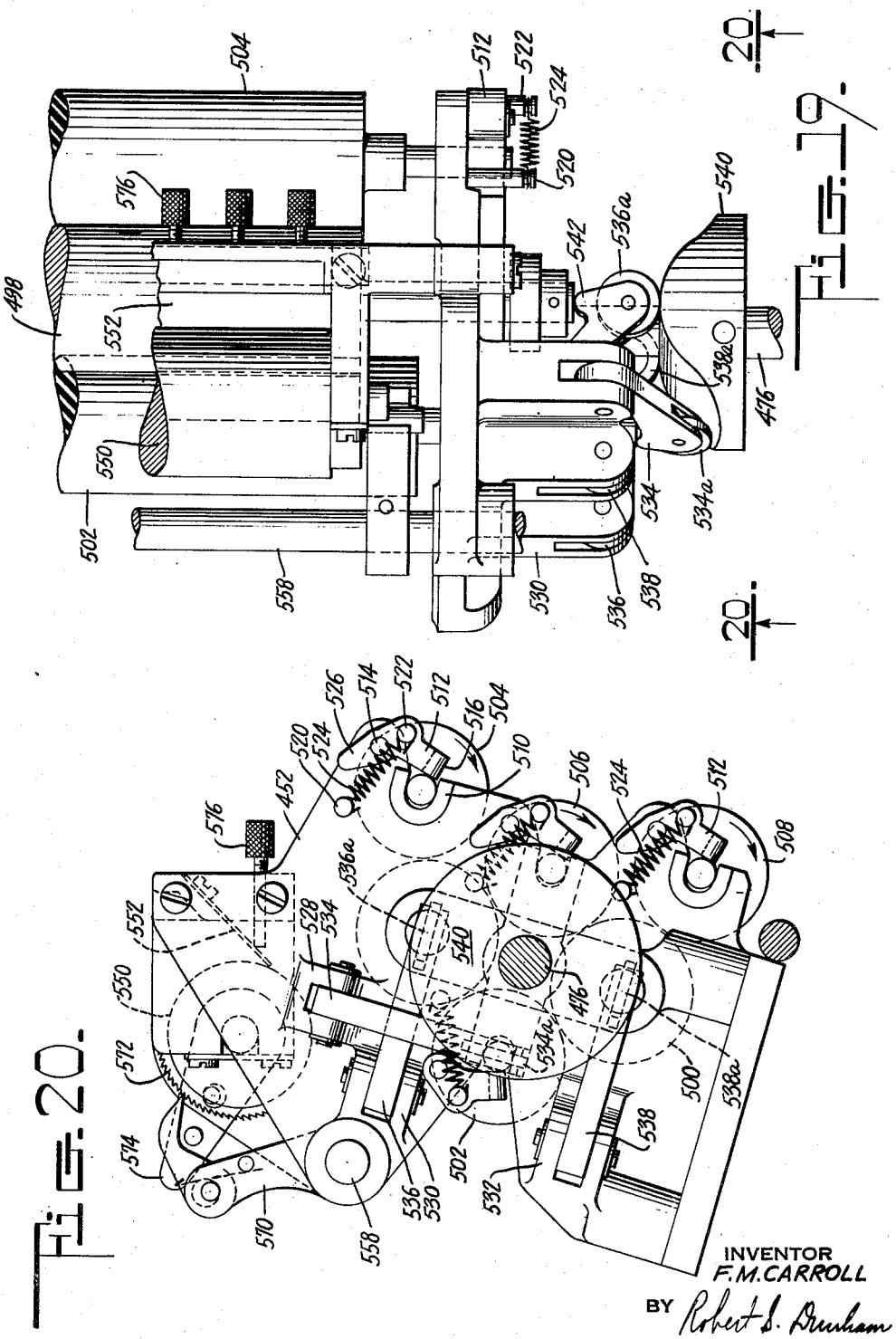

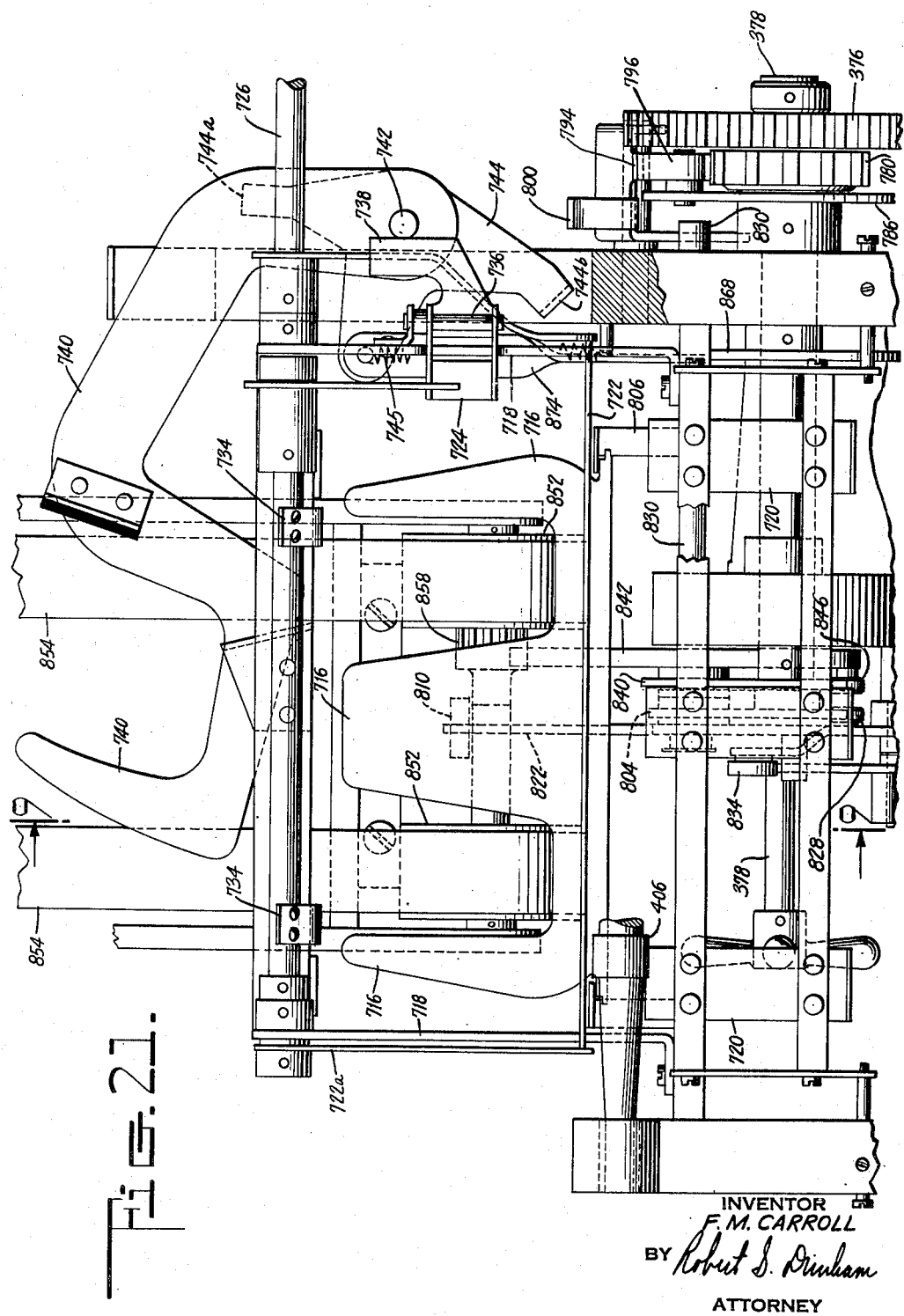

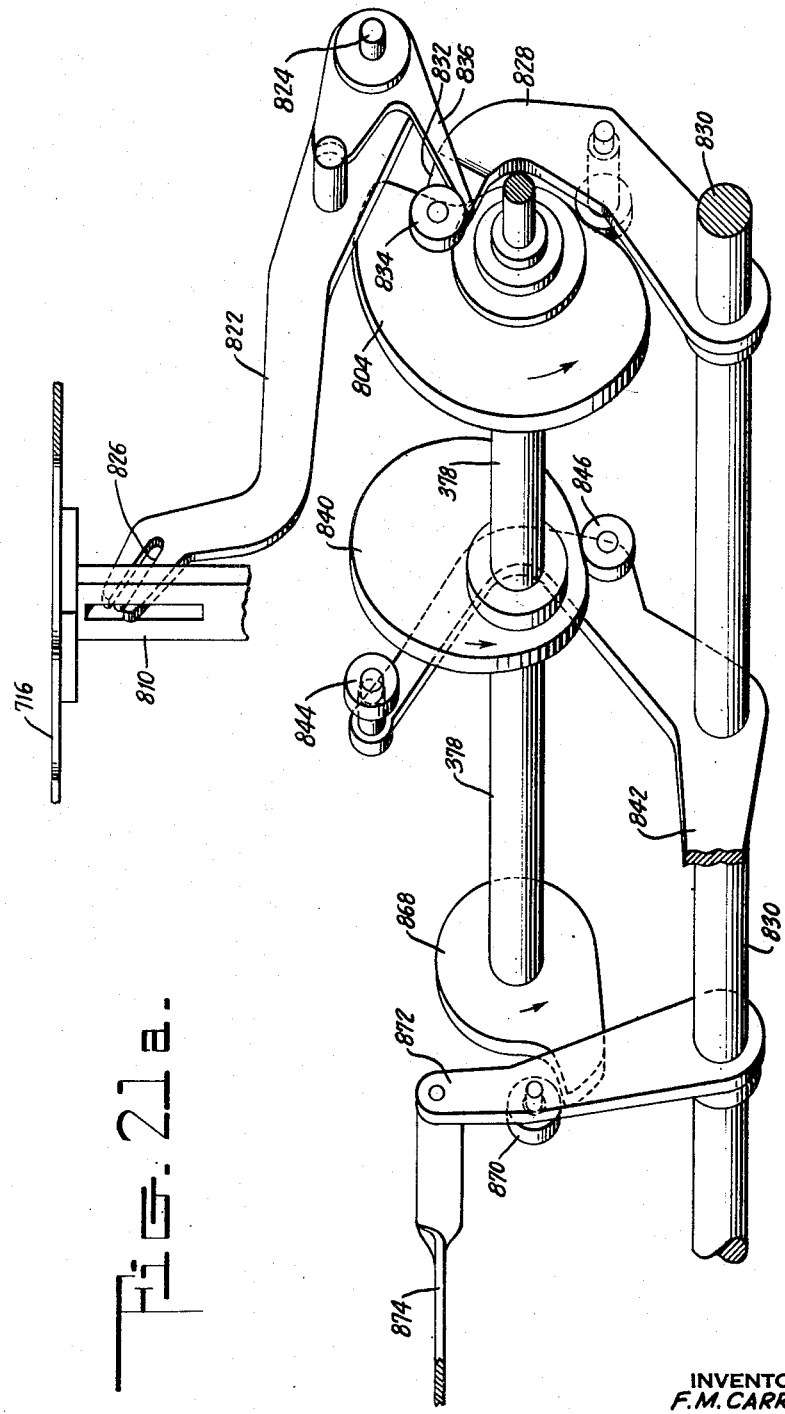

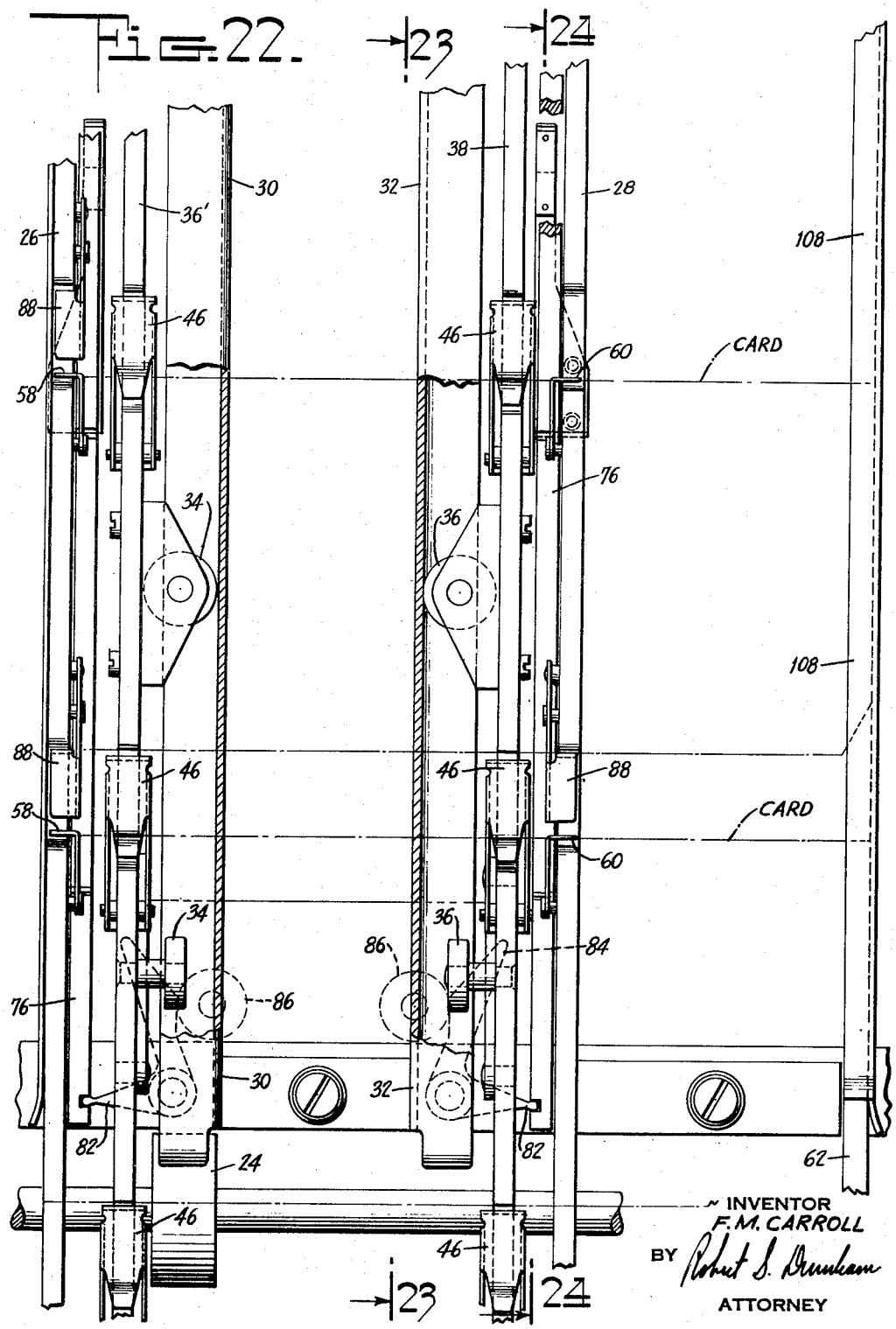

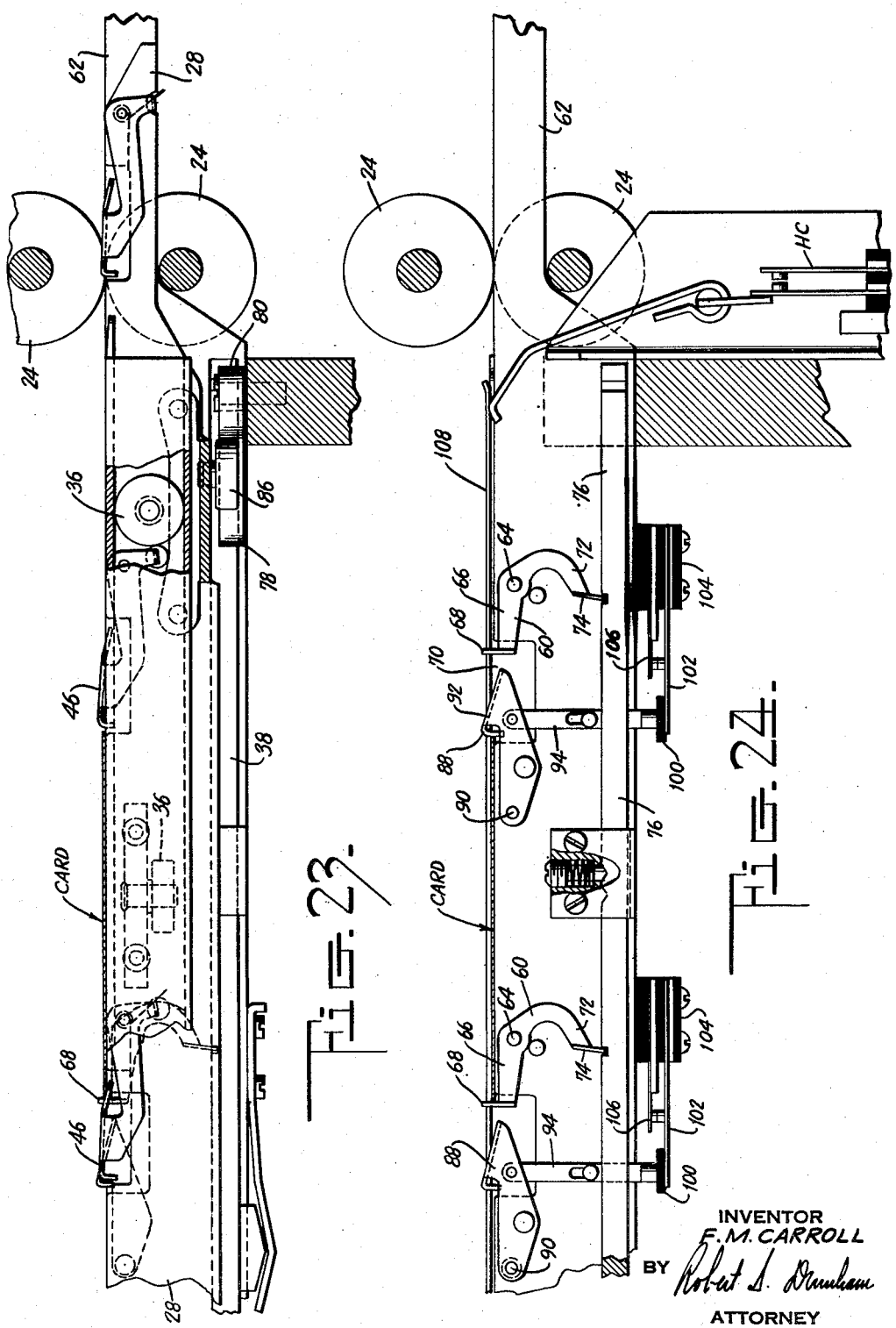

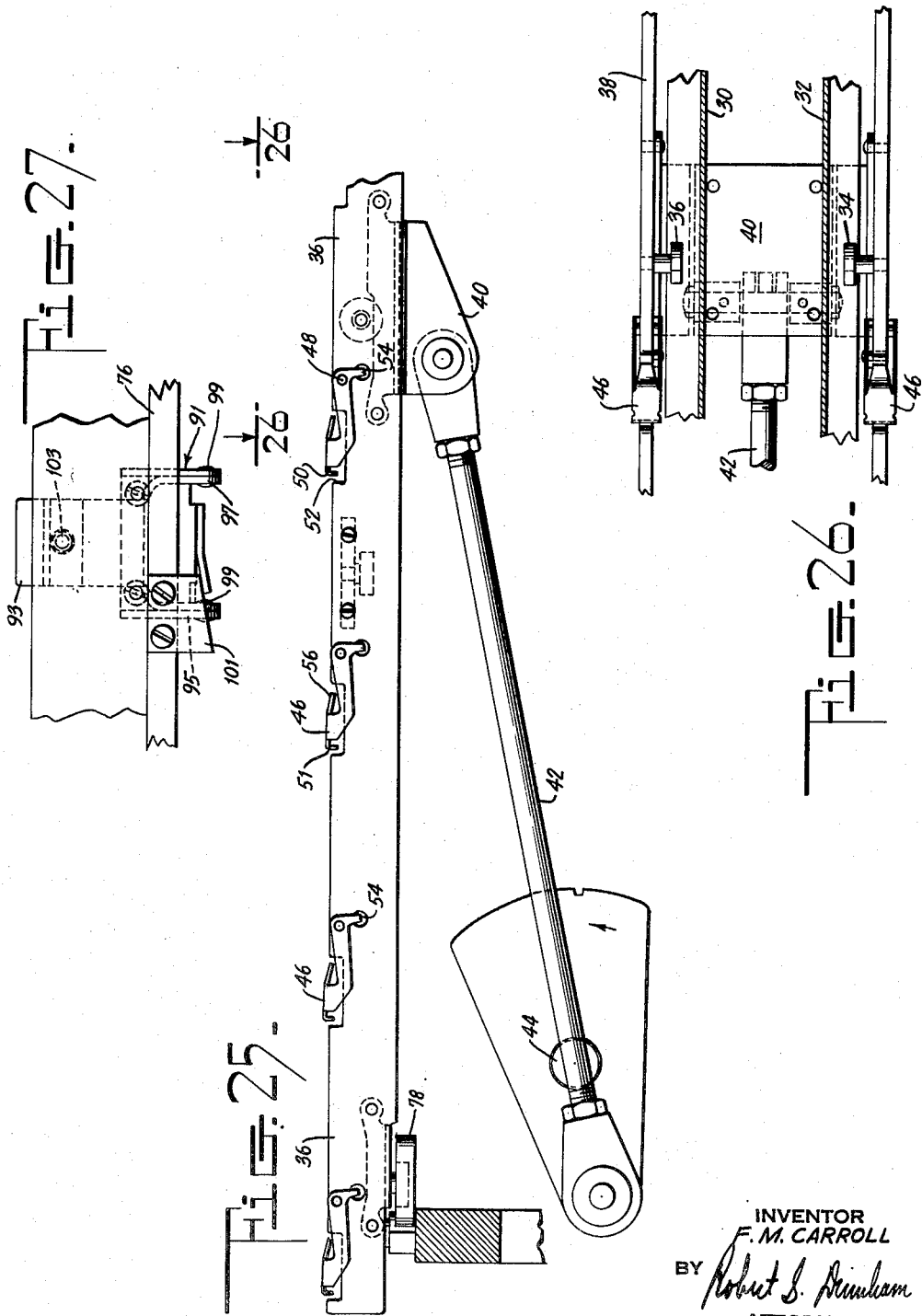

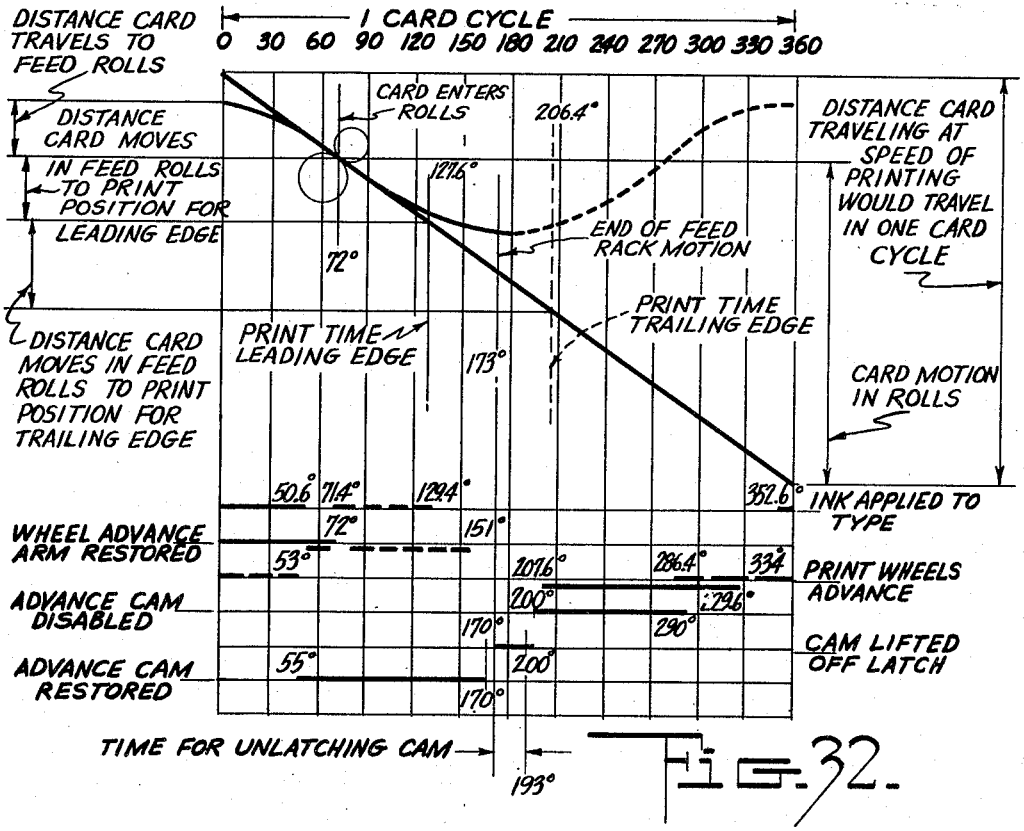

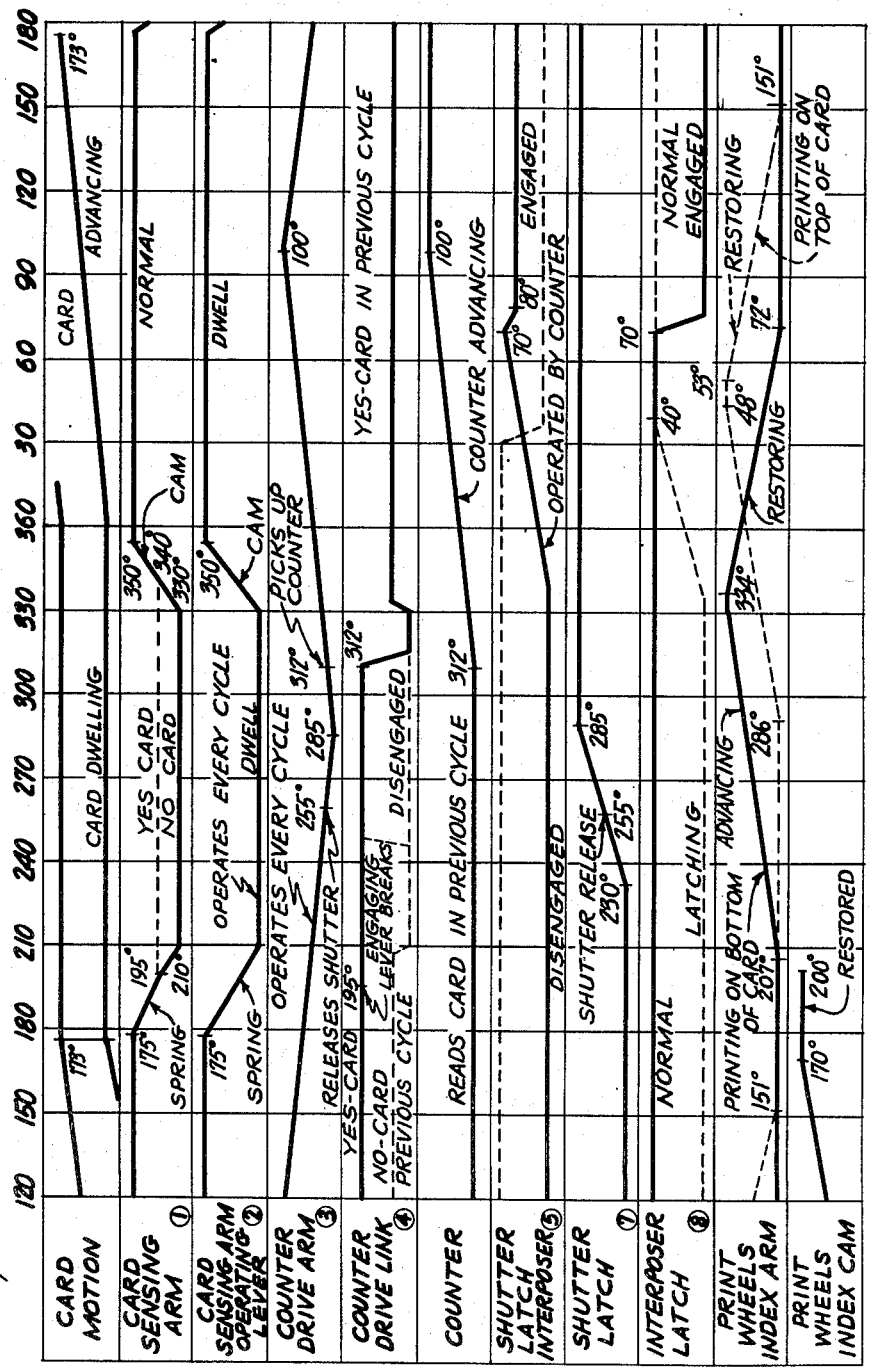

July 21, 1953
F. M. CARROLL
2,645,994
RECORD CARD PUNCHING AND NUMBERING MACHINE
Filed May 12, 1949
33 Sheets-Sheet 32
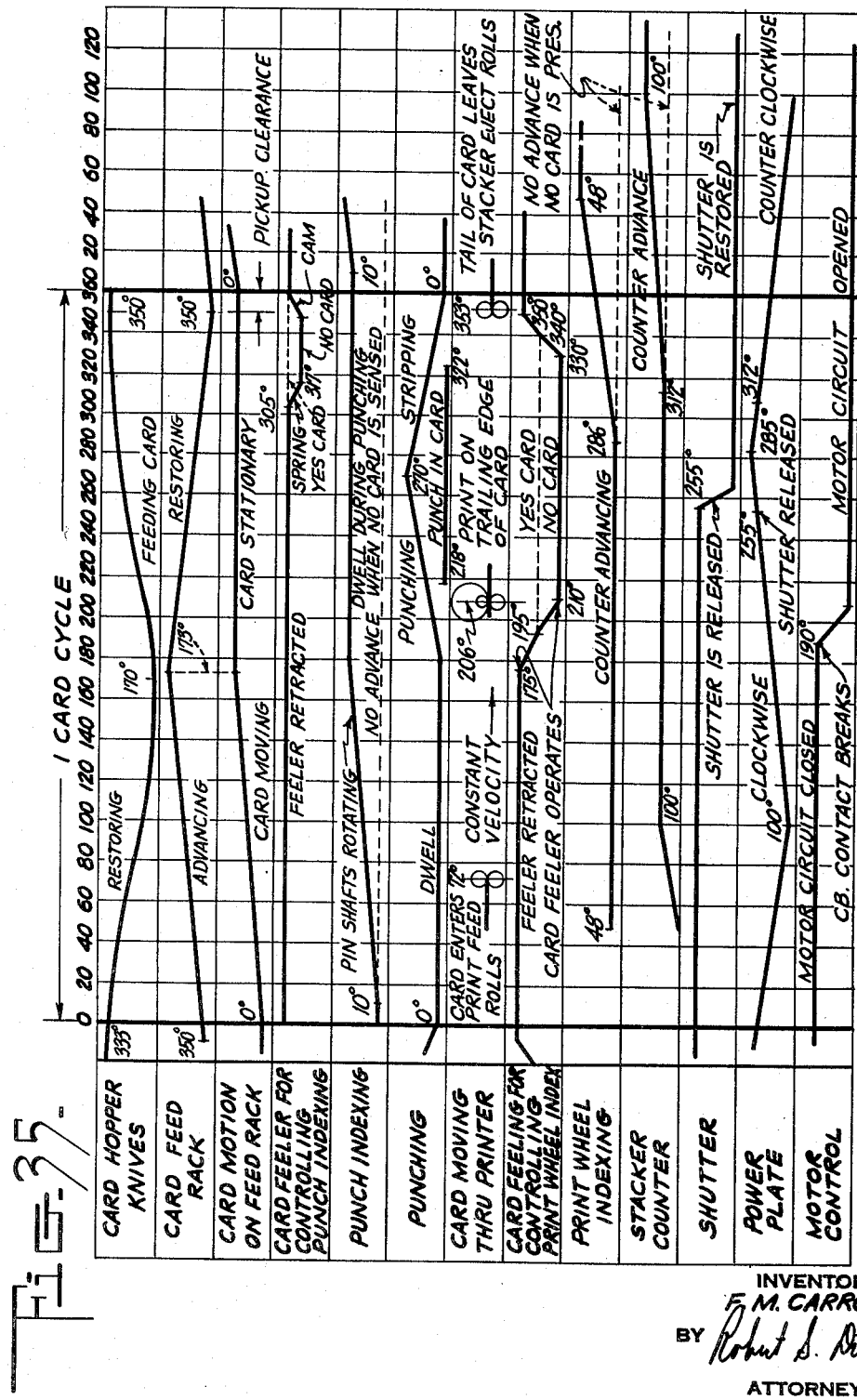
INVENTOR
F. M. CARROLL
BY Robert S. Dunham
ATTORNEY

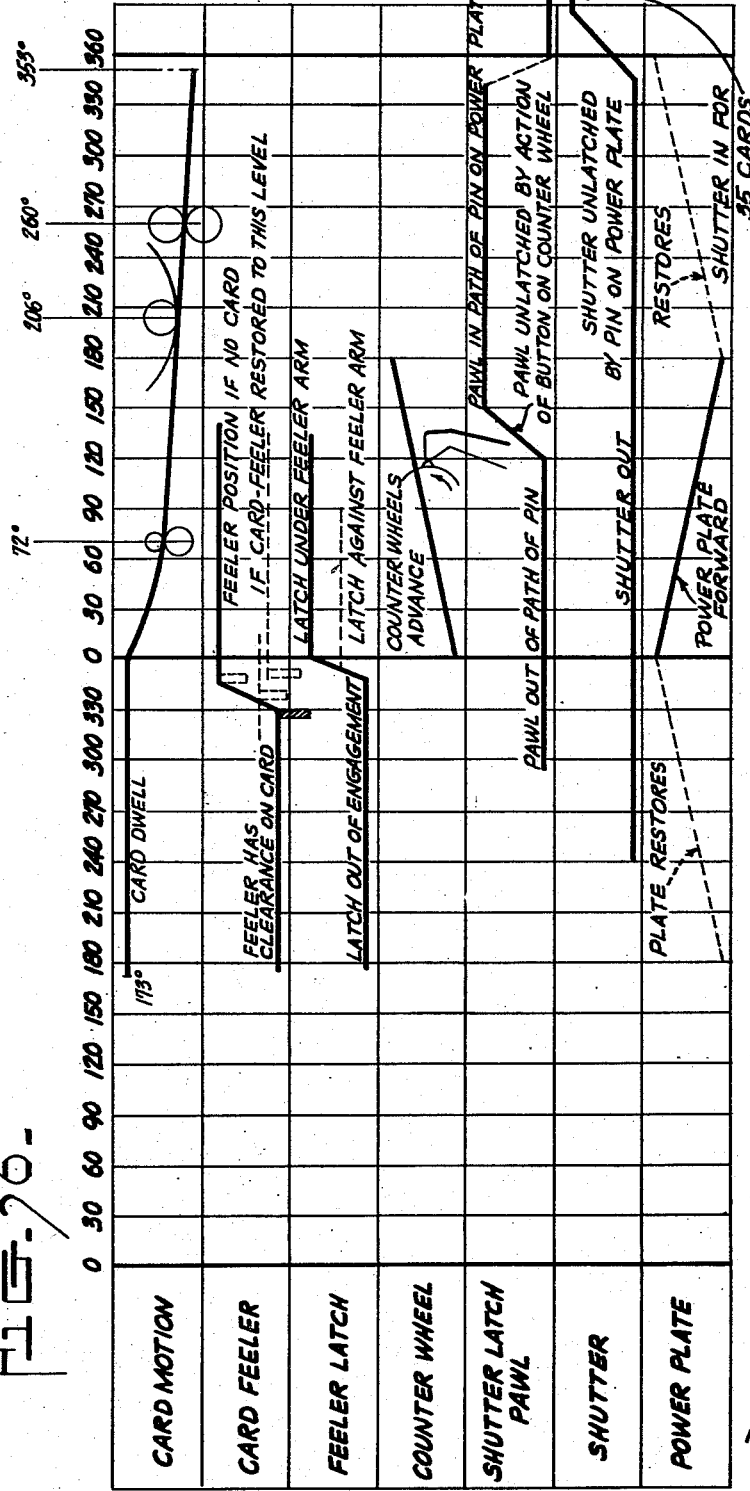

Patented July 21, 1953

2,645,994

UNITED STATES PATENT OFFICE 2,645,994

RECORD CARD PUNCHING AND NUMBERING MACHINE

Fred M. Carroll, Binghamton, N. Y., assignor to International Business Machines Corporation, New York, N. Y., a corporation of New York Application May 12, 1949, Serial No. 92,822

18 Claims. (Cl. 101—19)

This invention relates to a machine for processing record cards. More particularly, the machine is of a character designed to serially punch index points on record cards and for imprinting serial numbers thereon.

In general, the machine includes a punching unit, with which is associated a recorder. Spaced from the punching unit is a printing device, which includes indexible printing wheels, together with means for indexing the printing wheels, whereby serial numbers may be imprinted on a record card. A card conveyor is provided for advancing cards from a card magazine in step-by-step relation to the punching unit and to the printing device. Finally, mechanism is provided for counting, stacking, and transporting cards that have been processed.

It is, therefore, an object of the invention to provide improved punching and printing mechanisms, together with improved means for effecting the step-by-step feed of record cards in process to and away from punching and printing stations.

Among its objects the invention also contemplates improved means for counting cards that have been processed and for arranging such cards in stacks of predetermined numbers.

It is a further object of the invention to provide card controlled mechanism for rendering inoperative the recorder at the punching unit upon absence of a card at the punching station.

It is a further object of the invention to provide card controlled means for disabling the indexing device of the printing mechanism upon absence of a card in the printing device.

Furthermore, it is an object of the invention to provide mechanism insuring the orderly and progressive step-by-step feed of cards through the machine.

It is a further object of the invention to provide card controlled means for rendering inoperative the entire machine upon failure of regular step-by-step feed of cards therethrough.

It is still a further object of the invention to provide improved card counting and stacking mechanism, which is operatively associated with a take-off conveyor for removing stacks of processed cards of uniform predetermined numbers from the operative orbit of the machine.

The invention also contemplates specific improvements in a card punching mechanism, as well as specific improvements in the card advancing mechanism which is adapted to feed cards through the several processing stations of the machine.

Other objects and advantages of the invention will become apparent upon reading the following specific description in light of the drawings forming a part of this application, and in which drawings:

Figures 1a and 1b together constitute a plan view of the machine;

Figures 2a and 2b together constitute a side elevational view of the machine;

Figure 3 is a sectional view taken on line 3—3 of Figure 1b;

Figure 4 is a sectional view taken on line 4—4 of Figure 1b, parts being broken away to show underlying structure;

Figure 5:
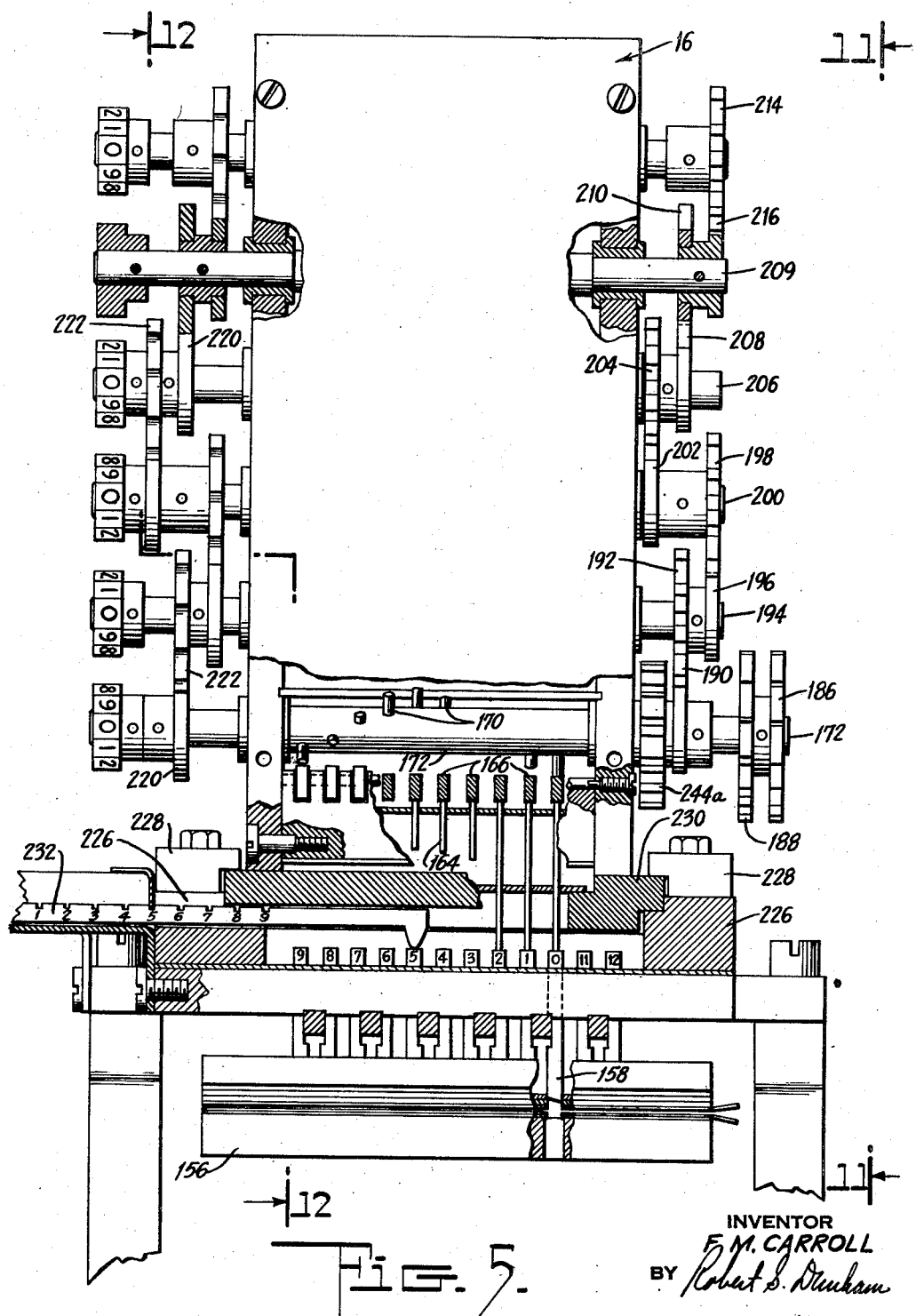
Figure 5 is a sectional view on line 5—5 of Figure 1b.
Figure 6A:
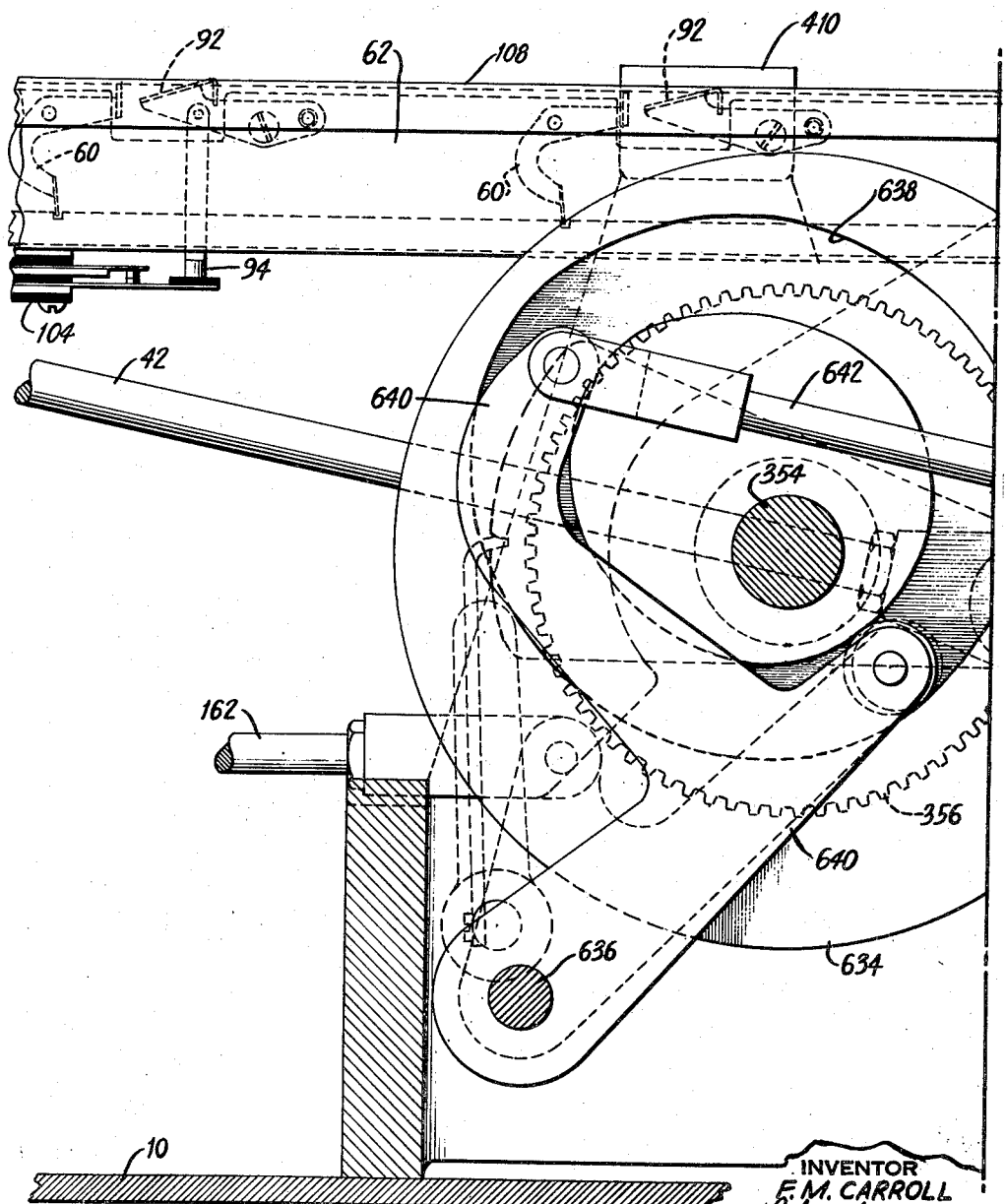
Figure 6B:
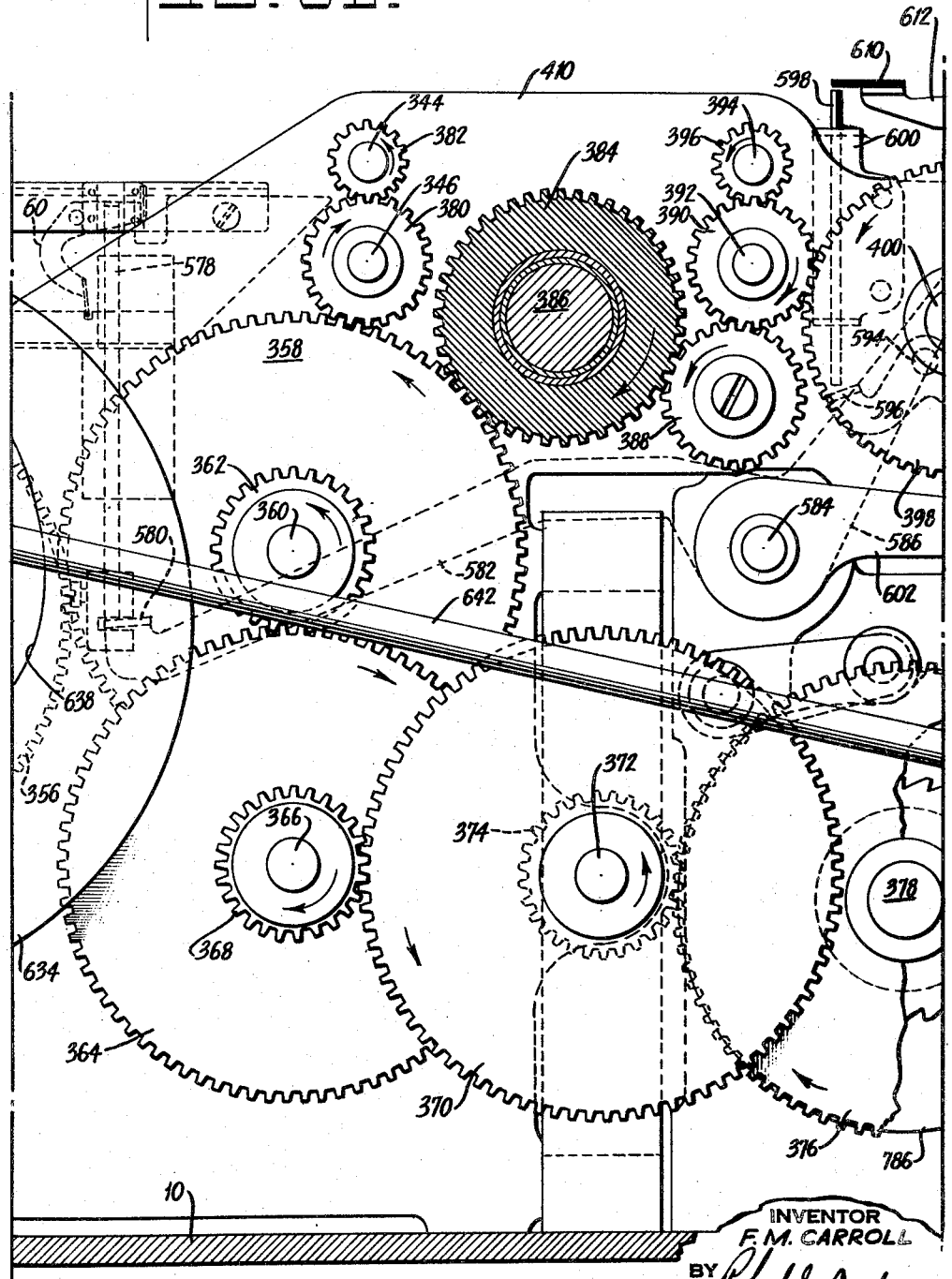
Figure 6C:
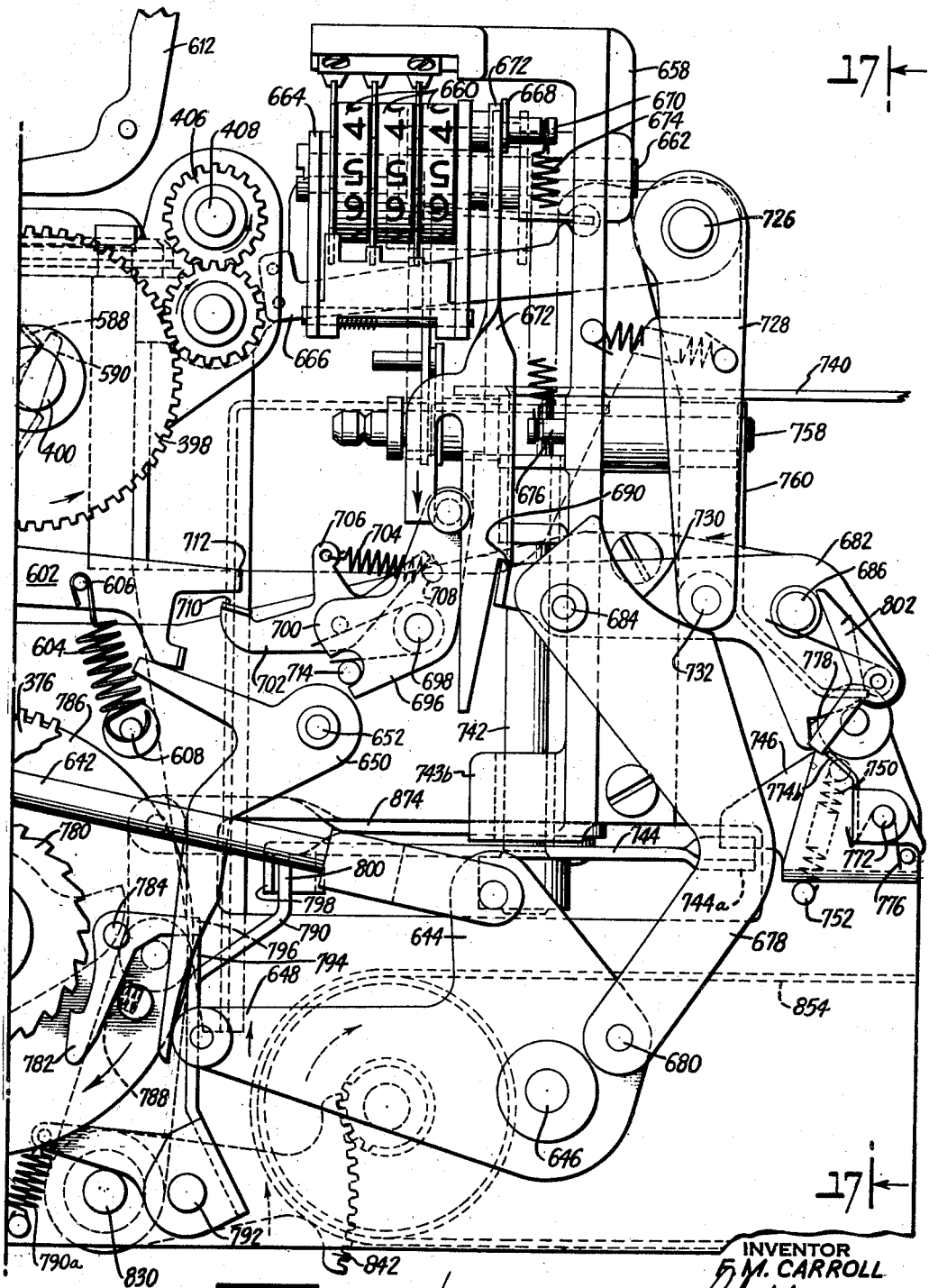
Figure 9:
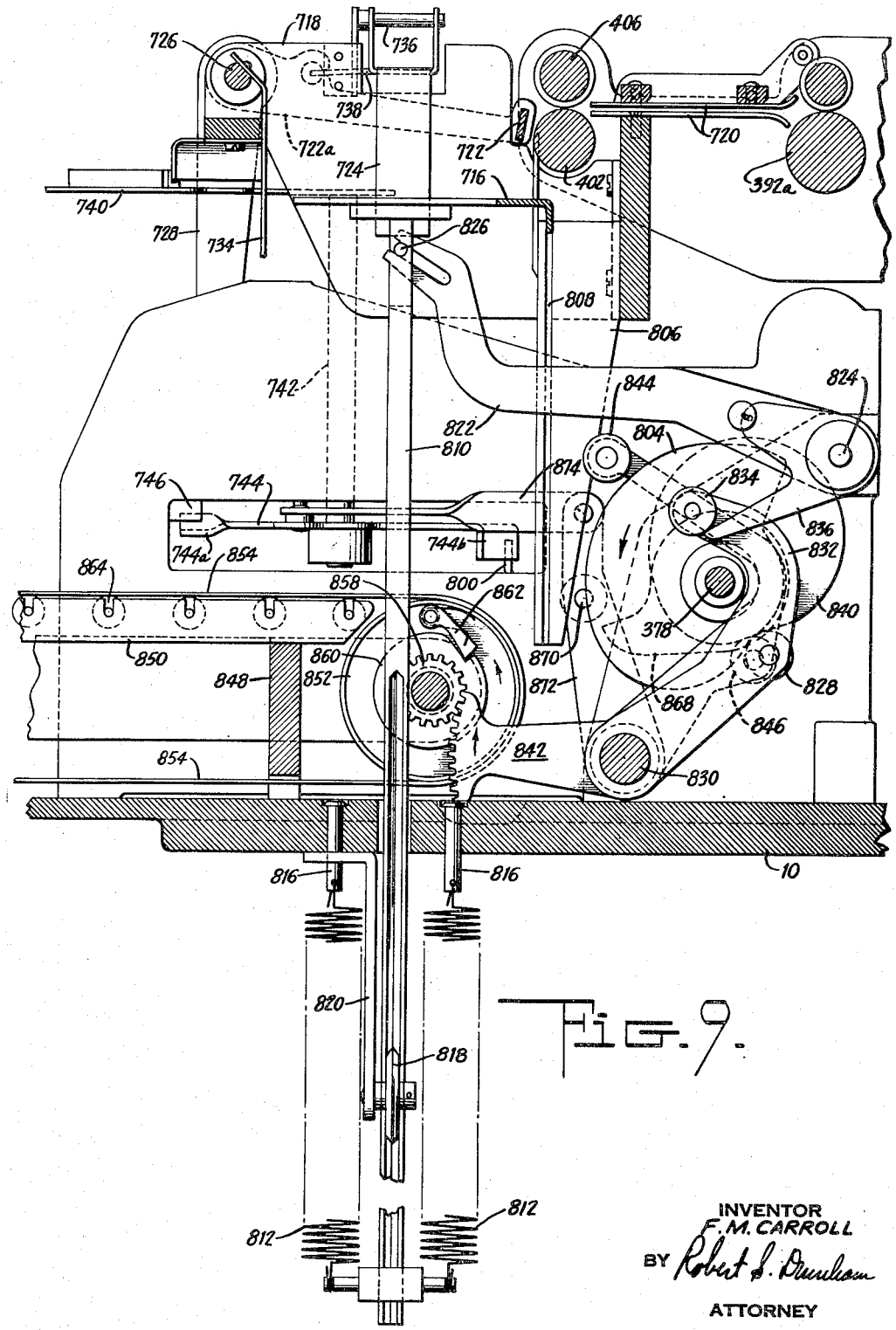
Figure 13:
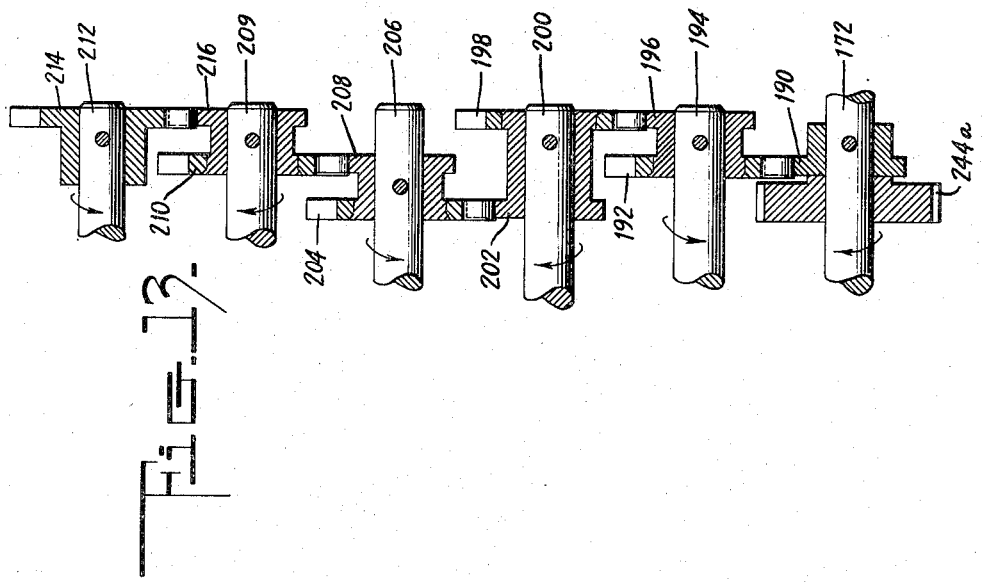
Figure 10:
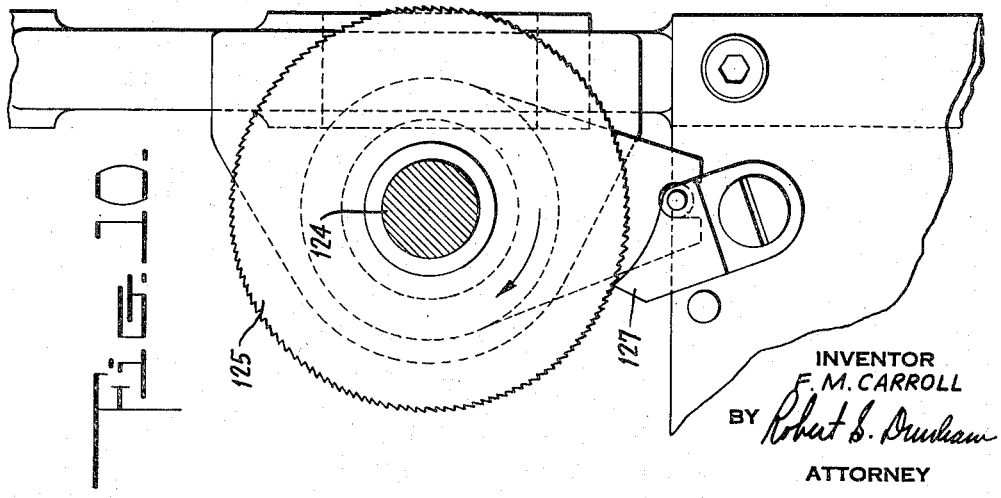
Figure 15:
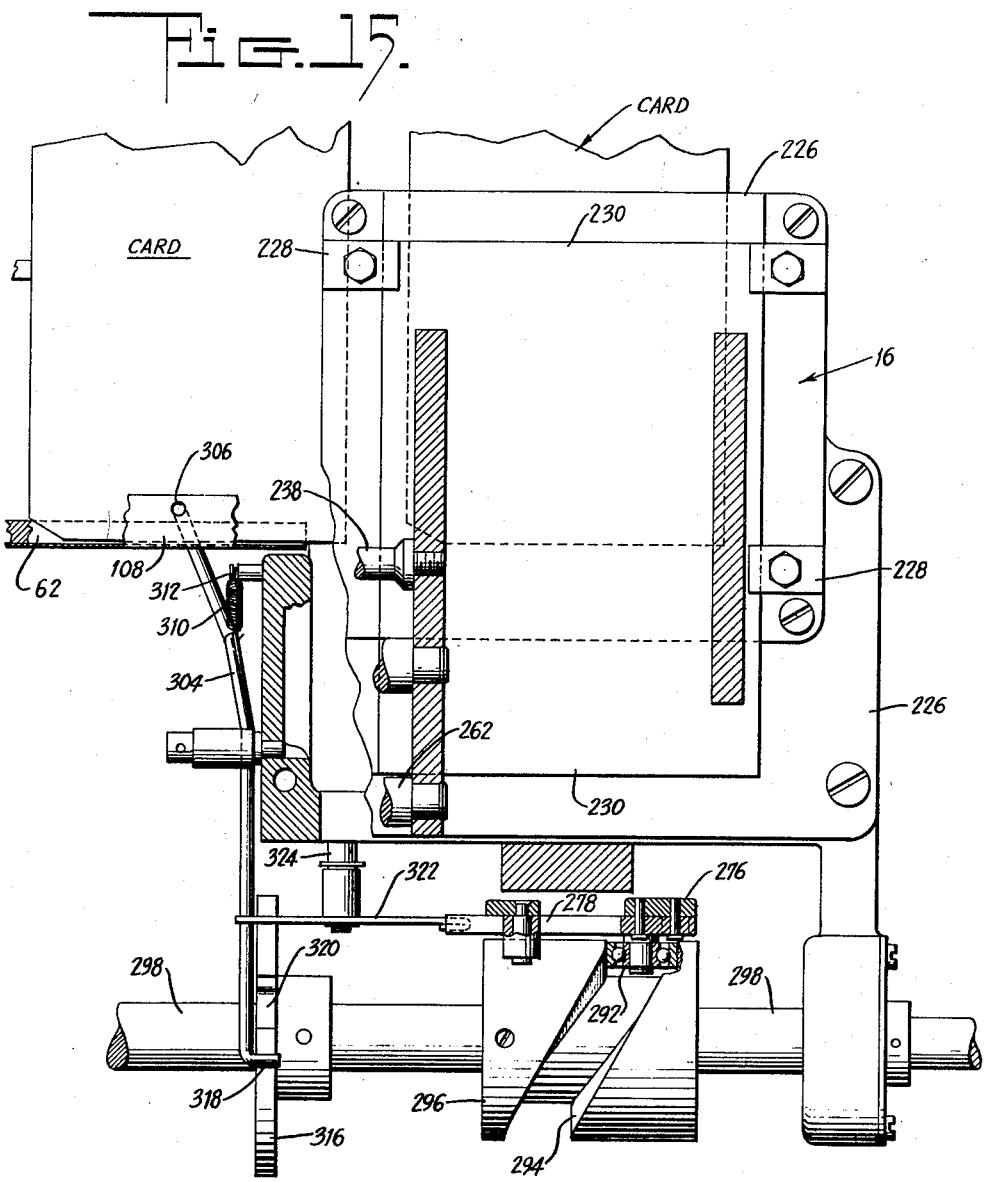
Figure 17A:
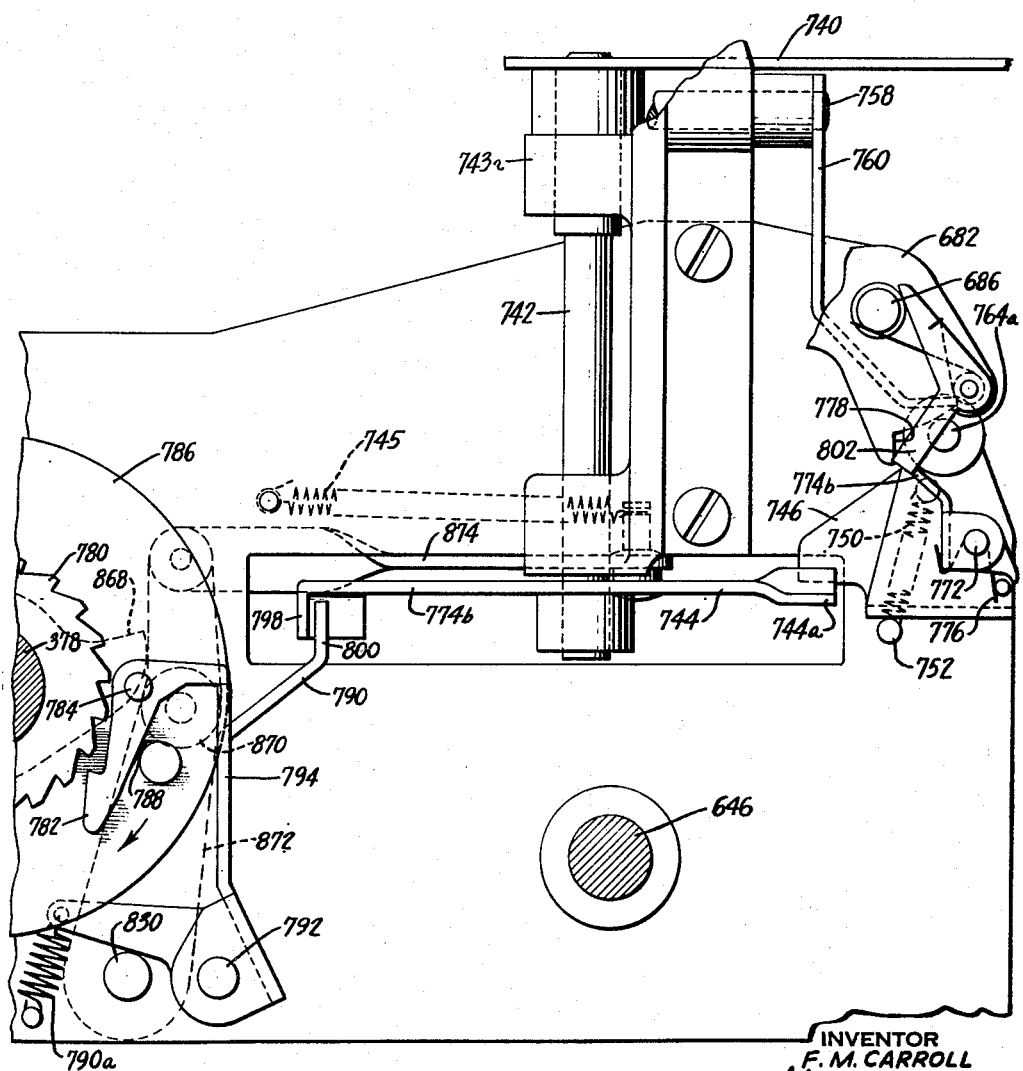
Figure 18:
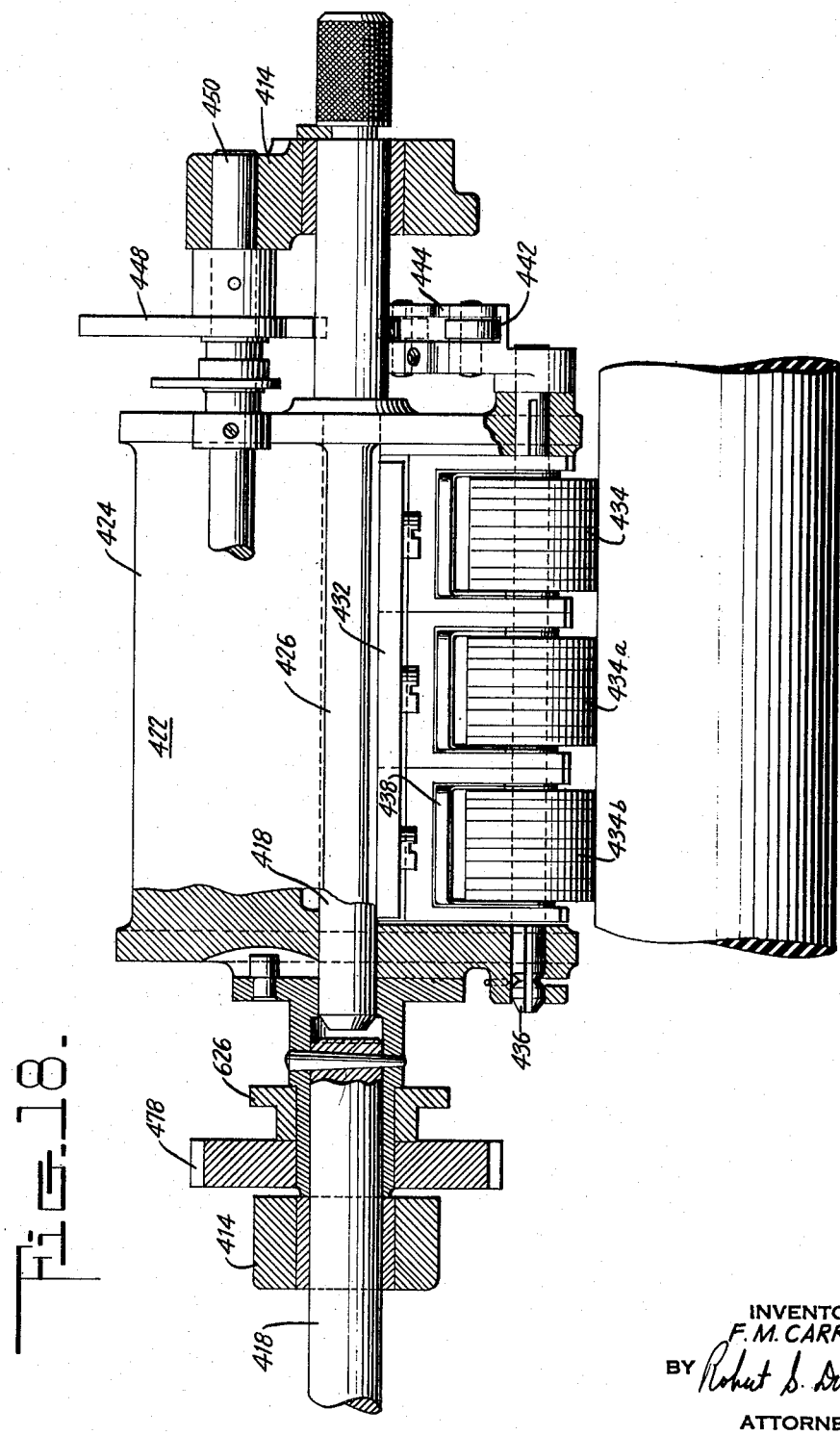
Figure 30:
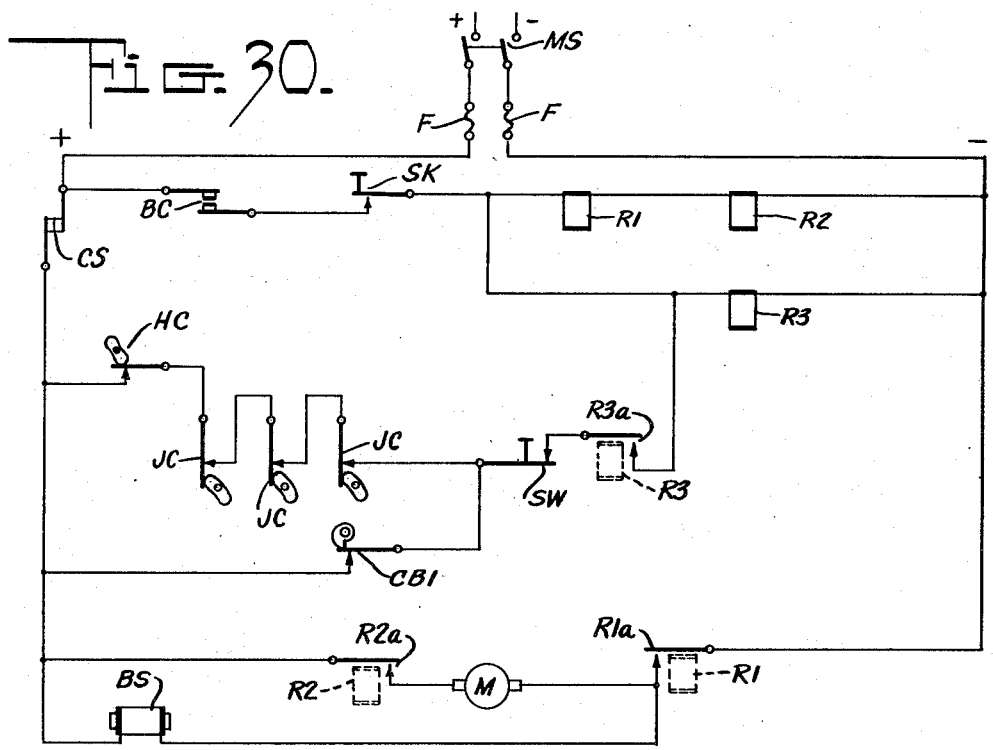
Figure 31:
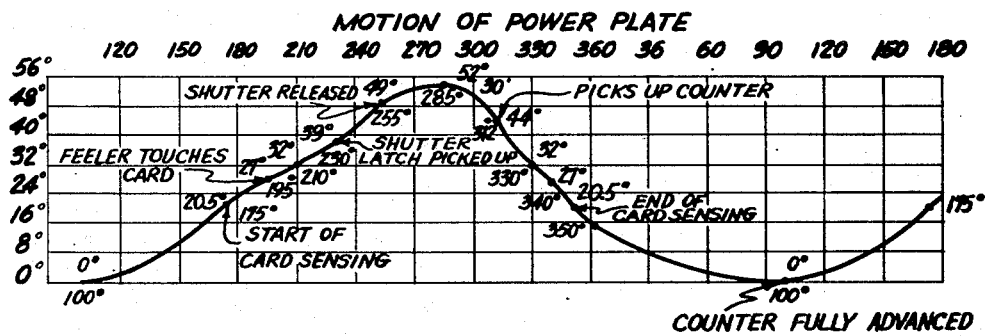

Figures 6a, 6b and 6c together constitute a view on line 6 of Figure 1a;

Figure 7 is a sectional view taken on line 7—7 of Figure 1a;

Figure 8 is a sectional view taken on line 8—8 of Figure 1a;

Figure 9 is a longitudinal sectional view taken on line 9—9 of Figure 1a;

Figure 10 is a transverse sectional view taken on line 10—10 of Figure 1a;

Figure 11 is an elevational view taken along line 11—11 of Figure 5;

Figure 12 is an elevational view taken along line 12—12 of Figure 5, parts being broken away to show underlying structure;

Figure 13 is a detail sectional view showing the accumulator drive gears appearing in Figure 11;

Figure 14 is a view taken on line 14—14 of Figure 4;

Figure 15 is a sectional view taken on line 15—15 of Figure 14;

Figure 16 is a longitudinal view, partially in section and partially in full line, showing the punch and die operating mechanism;

Figure 17 is a detail view on line 17—17 of Figure 6c;

Figure 17a is a detail view taken at right angles to Figure 17 and having overlying parts thereof removed to show underlying structure;

Figure 18 is a detail view, partially in section and partially in full line, showing a printing wheel assembly;

Figure 19 is a detail plan view of one end of the printing mechanism;

Figure 20 is an elevational view of the printing mechanism taken on line 20—20 of Figure 19;

Figure 21 is a detail plan view of card stacking and handling mechanism;

Figure 21a is a perspective view showing card handling mechanism control cam arrangements;

Figure 22 is a fragmentary plan view of card conveying mechanism;

Figure 23 is a side elevational view along line 23—23 of Figure 22, showing parts thereof broken away for the purpose of disclosing underlying mechanism;

Figure 24 is a side elevational view on line 24—24 of Figure 22;

Figure 25 is a fragmentary side elevational view of a card conveyor rail, showing a drive shaft connected thereto;

Figure 26 is a fragmentary plan view of the mechanism shown in Figure 25, as viewed from line 26—26 of Figure 25;

Figure 27 is a fragmentary view of card aligning mechanism forming part of the conveyor structure;

Figure 28 is a timing chart indicating the sequential movement of the card punching unit and its associated devices;

Figure 29 is a timing chart indicating the operation of the card punching die;

Figure 30 is an electrical control diagram;

Figure 31 is a timing diagram indicating the motion of a power plate;

Figure 32 is a timing diagram indicating the operation of the inking and printing device;

Figure 33 is a timing diagram indicating operation of the jam and hopper contacts forming a part of the electrical control system;

Figure 34 is a timing diagram indicating the operation of the card counter and the elevator shutter release mechanism;

Figure 35 is a timing diagram indicating the operation of the entire machine; and Figure 36 is a timing diagram showing the operation of the card counter and the card shutter mechanism.

General

As shown in Figures 2a and 2b, the machine is mounted on a horizontal frame or chassis 10 at one end of which is a conventional card hopper 12. A card feeding conveyor 14 is provided for the transfer of cards from the hopper 12 to a punching unit 16 and from thence to a number printing mechanism 18. From the printing mechanism 18, the cards advance through a card counting mechanism 20, at which point the cards are stacked in groups of predetermined size and carried off by a take-off conveyor 23.

The card hopper 12 includes conventional card feeding mechanism for picking cards, one at a time, from the bottom of a stack and advancing such picked cards into feed rolls 22 and 24. The card feeding conveyor 14 extends from a point adjacent the feed rolls 24 to a point adjacent the printing mechanism 18. The conveying mechanism includes devices for advancing cards one at a time in closely spaced relation.

Card conveyor

The card feed mechanism includes a stationary inner card guide 26 and a stationary outer card guide 28. (See Figures 22 to 27, inclusive.) Fixed to the base of the machine are a pair of card carriage guides 30 and 32. These guides consist of laterally opening U-shaped channel members, in which card carriage rollers 34 and 36 are adapted to reciprocate. Reciprocating card carriages 36' and 38 are adapted to move in unison by virtue of their connection to an actuator plate 40. The actuator plate 40 has journaled thereon a card carriage reciprocating arm 42, which receives motion from a cam shaft 44.

Each of the card carriages 36' and 38 has mounted in upwardly opening recesses 52 therein a plurality of card engaging fingers 46. The card engaging fingers are pivoted at their rear ends to the card carriage frame by pivot pins 48 so that the forwardly extending head 50 thereof may rock into and out of the respective recesses 52 in the card carriage frames. The upwardly projecting head 50 of the card engaging finger is normally held in its upper position above the upper edge of card carriage frame under yielding pressure of a spring 54. The tension of the spring 54 is so adjusted as to hold the card engaging finger 46 under light tension. It will be noted that the card engaging fingers include a downwardly bent tail piece 56, the free end of which normally occupies a position within the recess 52. As a consequence of this structure, the card carriage frames 36 and 38 may be reciprocated in a direction opposite to the movement of the cards and the tail piece 56 of the card engaging finger 46 will pass under a card in the process of moving in such opposite direction along the conveyor guides. The spring tension, under which the card guide fingers are held, is sufficiently light to permit depression of the fingers by contact with an overlying card. When the head 50 of a card finger has moved beyond the rear edge of a card, the head 50 will rise to its elevated position where the down-turned flange 51 intersects the edge of card positioned forwardly thereof. In such relation the finger is positioned to engage the rear edge of a card and thereby advance the card another step upon forward reciprocation of the card pusher frame. In the present embodiment of the device, each of the card carriages 36' and 38 are provided with eight card engaging fingers which are arranged in transversely aligned pairs on opposite carriage frames.

The outer card guide rail 28 (see Figure 24) carries a plurality of card stops 58, which cooperate with companion card stops 60 arranged on the inner card guide rail 26. The card guide rails are disposed in the same horizontal plane and in parallel relation with respect to each other. Herein the card stops 58 and 60 are each seven in number and they are arranged at spaced points along their respective rails to constitute transversely aligned pairs. The card stops 58 and 60 comprise generally U-shaped elements pivoted to the side of their supporting rails by means of pivot pins 64. Each card stop includes a forwardly extending arm 66 which has an upwardly projecting card stop lip 68 normally lying within a recess 70 opening through the upper edge of the support rail. The card stops are adapted for rocking movement about the pivot points 64 whereby the card stop lips 68 are projected upwardly beyond the upper edge of the card stop assembly rails and consequently into intercepting position with respect to the forward edge of an advancing card.

The opposite arm 72 of the card stop structure includes a flange 74, the free edge of which is adapted to rest in a transverse notch opening through the upper edge of a reciprocating card stop operating bar 76. When the card stop operating bar 76 is reciprocated, it effectively projects and alternatingly withdraws the card stop lip 68 out of and into the path of the advancing forward edge of a card moving along the card guide rails 36 and 38.

The means for reciprocating the card stop operating bars 76 consists of card stop cam levers associated with opposite ends of each operating bar. In Figures 22 and 23 are shown the cam levers associated with the rear end of the operating bars 76. Herein a pair of oppositely disposed cam stop levers 78 are pivoted for rocking movement in a horizontal plane about a pivot stud 80. Each cam lever has angularly disposed ends 82 and 84. The end 82 constitutes an operating arm, which has a connection with its associated card stop operating bar 76, the connection herein being shown as a slot for receiving the end 82 of the cam lever. The opposite arm 84 of each of the cam levers constitutes a cam surface normally riding in contact with a cam roller 86 fixed for reciprocation with the card carriage rails 36 and 38. The face of the cam surface 84 is so contoured as to cause the card stop cam lever to rock about its pivot point 80 as the card carriage approaches its extreme position of movement in one direction during the reciprocatory cycle. Let it be assumed that the cam levers at the rear end of the conveyor structure are so contoured as to move the stop operating bars 76 in a rearward direction. As the card carriage is moved rearward, the result will be the retraction of the card stops controlled thereby. Inasmuch as the opposite or forward end of the conveyor structure has a similar set of card stop cam levers (see Figure 25), which are, however, oppositely disposed, the forward reciprocation of the card carriage will thereby be effective to move the card stop operating bars 76 forwardly, thereby projecting the lip 68 of the card stops into intersecting position with respect to the forward edge of a card approaching the same. It will follow, therefore, that the card stops are projected upon reciprocation of the card advancing carriage in one direction of its movement and are retracted in the opposite direction of its movement. In any event, the timing is such that the stop lips 68 are projected into the path of a card, whose forward edge approaches the normal vertical plane in which the lip moves, but they are held in retracted position during the forward movement of a card thereover on a subsequent reciprocation of the carriage structure. It is to be noted, of course, that the card stops 58 and 60 are spaced along the card stop operating bars in oppositely disposed pairs at equidistant points along these bars, the spacing thereof corresponding to the distance of each step-by-step advance of the cards along the card guide frame under the influence of the card pushers 36 and 38.

Associated with each of the card stops 58 and 60 and located in the upwardly opening recesses 70 are card jam contact levers 88. The levers 88 are pivoted at their forwardly disposed ends 90 for rocking movement with respect to their respective support frames. The forward end of each lever has a rearwardly inclined face 92, the lower edge of which extends into the recess 70 and the upper edge of which normally lies above the plane of the card support edge of the card guide assembly rail. A contact operating rod 94 is engaged with the rearwardly extending body of the card jam contact lever 88 and the same is guided for reciprocating motion in a vertical direction by means of a stud 96, which extends through an elongated slot 98 within the body of the operating rod 94. The lower insulated end 100 of the contact operating rod is normally in engagement with a contact leaf 102 constituting one of a pair of spring contact members of a switch structure 104. The other contact leaf 106 of the switch structure overlies the contact leaf 102 in a normally closed position. The resilience of the leaf 102 is sufficient to hold the contact operating rod 94 in an elevated position and as a consequence the rear edge of the inclined face 92 of the card jam contact levers 88 is projected into the path of movement of an advancing card. Because of the rearwardly inclined face 92 an advancing card depresses the card jam contact levers 88, lowering the contact operating rod 94, and breaking electrical contact between the contact levers 102 and 106. Passage of a card beyond the face of the card jam contact lever permits the lever to rise under the influence of the resilient switch leaf 102, which thereby again closes the circuit between the leaves 102 and 106. The full significance of this operation will be explained at a later point.

A card retaining rail 62 has an overlying card guide flange 108, under which one edge of an advancing card is adapted to engage thereby holding the card against the upper face of the card retaining rail 62 as it is carried along by the conveyor mechanism. A pair of card grids 110 and 112, Figures 1a and 1b, are positioned in overlying relation to the card conveyor and further tend to keep the cards flat as they are moved along the conveyor structure. The card grid 110 at the rear of the conveyor has attached to one end thereof pivot brackets 114, by means of which the grid is pivoted to stationary frame members 116. By means of the pivotal mounting of the grid 110, the same may be swung into an open position for allowing access to cards thereunder or to underlying conveyor structure. A latch device 118 is provided for holding the grid 110 in an open position and a spring catch mechanism 120 is provided on the opposite side thereof for latching the grid in its closed position. The grid structure 112 at the forward end of the conveyor is removably positioned on the card guide rails 26 and 28.

The grids 110 and 112 are spaced from each other at the punching station 16, thus providing space for a card positioning device 91, which is adapted to insure the proper transverse position of a card in the punching station. The positioning device 91 is fixed to the side rail of the card conveyor 14 and it consists of a spring biased plate 93, the upper end of which projects above the card guide 26. The plate 93 is supported by a bracket 95, which is hinged to a mounting bracket 97 by means of pintles 99. A cam mechanism 101 carried by the card stop operating bar 76 cooperates with the plate supporting bracket 95 to flex the plate 93 against the force of a spring 103, thereby causing the upper end thereof to spring inwardly against the end of a maladjusted card on the card guide immediately in front thereof.

A motor 122, Figure 3, is suitably supported from the frame structure and power is transmitted therefrom to a longitudinally disposed drive shaft 124. Keyed to the end of the drive shaft 124 is a drive pulley 126, which is connected to the motor pulley 128 by means of a drive belt 130. The initial sets of card feed rollers 22 and 24 (Figure 1b) are driven from the drive shaft 124 through a series of gears. Keyed to the shaft 124 is a drive gear 132, which operates in contact with a transmission gear 134 that is mounted on a stud shaft 136, which extends rearwardly from a machine frame bracket 138. The transmission gear 134 is in mesh with a counter shaft gear 140, which is keyed to the end of a counter shaft 142. The counter shaft 142 has formed thereon worm gears 144, 146 and 148. The worm gear section 144 is in contact with spiral gears 150 fixed to the shafts to which are fixed the feed rollers 24. The worm gear section 146 extends between and operates in contact with spiral gears 152 keyed to the ends of shafts to which the feed rollers 22 are fixed. As a result of rotation of the counter shaft 142, the spiral gears 150 and 152 will be rotated to impart rotary motion to the feed rollers 22 and 24. The worm gear section 148 of the shaft 142 is in contact with card picker mechanism (not shown), by which the cards receive an initial impetus from the card hopper 12. A manual knob 154 is provided at the end of the counter shaft 142 for the purpose of permitting manual rotation of the shaft. The drive shaft 124 has fixed thereto, at a point adjacent its forward bearing, a ratchet disk 125, which rotates in contact with a pawl 127. Normal rotation of the shaft 124 is thereby permitted, but retrograde rotation thereof is inhibited by the ratchet disk-pawl combination. This serves to stabilize the rotary movement of the shaft and avoids the danger of backlash.

*Punching mechanism*

It is contemplated that cards to be fed from the card hopper 12, through the card feed rollers 22 and 24 and then along the card conveyor 14 in step-by-step relation with an intermittent movement which provides a brief dwell between each advancing step. During the dwell of the cards, they are subjected to processing operations such as occur in the serial punch unit 16. The serial punching unit 16, which is shown in greater detail in Figures 11, 12 and 16, is disposed along one edge of the card conveyor track and the same is designed for punching serially arranged index points in one end of a card as it rests in the punching station. As each card advances, it dwells momentarily with one end thereof disposed in a sliding punch die block 156. The die block is adapted for vertical reciprocation with respect to a series of superimposed punches 158. The die block is carried in the upper end of a die operating frame 160 and the frame is vertically reciprocated by a cam operated crank mechanism 162.

The punches 158 are controlled by selectively blocked interposers 164, upon which rest interposer or blocking levers 166, which are successively and in serial order inhibited from rocking on their pivots 168 by one of a series of spirally arranged pegs 170 extending radially from transverse accumulator shafts 172.

The several punches 158 are free to rise and fall with the advance and retraction of the slidable punch die block 156 except when an interposer lever 166 is prevented from rocking on its pivot point 168 by virtue of contact with a peg 170 on an accumulator shaft. Herein the punch control and accumulator mechanism is designed for the automatic control of six banks of punches representing units, tens, hundreds, thousands, tens of thousands and hundreds of thousands, respectively, and each bank may be conveniently arranged to include ten punches representing digits from 1 to 9 and zero. In connection with each punch is an interposer rod 164 and these rods are consequently arranged in six banks 164, 174, 176, 178, 180 and 182 exercising control over the punches representing units, tens, hundreds, thousands, tens of thousands and hundreds of thousands, respectively. Each succeeding bank of interposer rods extends to a height somewhat greater than that of the preceding bank, so that the several banks of interposer rods present a stepped arrangement. A perpendicularly disposed interposer lever 166 is arranged in contact with the free end of each interposer rod and consequently a bank of ten such levers is arranged on each of the transverse lever supporting beams 184. It is apparent that a lever bank is located in subjacent relation with respect to each accumulator shaft 172 and in such proximity thereto as to be in substantial contacting position with the pegs 170 when such pegs are rotated into a substantially perpendicular position with respect thereto. By virtue of the spiral arrangement of the pegs 170 on each of the accumulator shafts, the pegs are successively rotated into blocking contact with successive interposer levers 166 of its respective bank and thereby the punches 158 are controlled by a given bank of interposers and are successively held against upward movement. Consequently, the punches are successively conditioned for the punching of cards passing into the punch die block 156.

Provision is made for regularly rotating the unit accumulator shaft 172 which controls the unit bank of punches. Further provision is made for transferring motion from each lower order shaft to each higher order shaft during rotation thereof for mechanically and automatically advancing the shafts for achieving serial punching of the cards. This mechanism will now be referred to. As shown at the right of Figure 5 and also in Figure 11, the units shaft 172 has keyed to the end thereof a pair of ratchet wheels 186 and 188, the teeth of these ratchet wheels being oppositely disposed for engagement with drive pawls which are adapted to drive the accumulator shaft in opposite directions. Thus, the first ratchet wheel 186 is disposed for positive rotation of the shaft, while the second ratchet wheel 188 is disposed for negative rotation of the shaft, that is to say, operation of the first ratchet wheel 186 will drive the shaft 172 in a clockwise direction as viewed in Figure 4, and thereby rotate the shaft to render effective interposers in a left to right direction, whereas the counter-clockwise rotation of the second ratchet wheel 188 rotates the shaft 172 for negative operation of the punch and accumulating mechanism. The specific drive means for selectively driving the ratchet wheels 186 and 188 will be referred to more particularly hereinafter.

It is appropriate at this point to consider the manner in which accumulating motion is transmitted from one shaft to another in the punch and accumulator mechanism. The unit shaft 172 has a single tooth gear 190 fixed thereto and this tooth is adapted to advance a ten tooth gear 192 fixed to the tens shaft through the distance of a single tooth upon each complete revolution of the unit shaft 172. The tens shaft 194 has an outwardly disposed single tooth gear 196, which is adapted to engage a ten tooth gear 198 on the hundreds shaft 200 and thereby advances the hundreds shaft 200 through the distance of a single tooth upon each complete revolution of the single tooth gear 196 on the tens shaft. In like fashion, the hundreds shaft 200 has a single tooth gear 202 keyed thereto in such position as to contact and operate a ten tooth gear 204, which is keyed to the thousands shaft 206 for advancing the thousands shaft through the distance of a single tooth upon each completion of a revolution of the hundreds shaft 200. Motion is similarly transmitted from the single tooth gear 208 of the thousands shaft 206 by advancing the ten tooth gear 210 thereon through a single position upon each revolution of the thousands shaft 206. Motion is similarly transmitted to the hundred thousands shaft 212, which has attached thereto a ten tooth gear 214 operable through the distance of a single notch upon each complete revolution of the single tooth gear 216 of the ten thousands shaft.

The opposite ends of the accumulator shafts 172, 194, 200, 206, 209 and 212 have the elements of a Geneva gear attached thereto for the purpose of stabilizing the accumulator mechanism against free rotation of the respective shafts when not engaged with one of the single tooth gears. The units shaft 172 has attached thereto a disk 220 having a notch opening through the periphery thereof. The peripheral face of the notched gear 220 is normally in contact with one of the arcuate scallops in the peripheral face of a gear 222 fixed to the tens shaft 194. It will be noted, therefore, that so long as the scalloped face of the gear 222 is in contact with a complementary face of the notched gear 220, the shaft 194 is inhibited against rotation. However, when the notch 224 presents itself to the point between two of the scallops on the Geneva gear, the shaft 194 is permitted to rotate through the distance of a gear tooth. Once the notch 224 has rotated out of range of the point, the shaft under its control can no longer rotate. The notch rotates through a complete revolution and again presents its clearance to the complementary Geneva member. The notch 224 is in lateral alignment with the single tooth on the single tooth gear 198 at the opposite end of the accumulator shaft. It is, of course, to be noted that similar Geneva gear combinations are carried by each of the succeeding higher accumulator shafts, so that the entire accumulator unit assembly is stabilized against undesired rotation.

By reference to Figure 5 of the drawing, it will be noted that the accumulator unit is mounted on guideways 226 for lateral adjustment with respect to the punch block 156. It will be noted by reference to Figure 12, therefore, that the interposer rods of the accumulator unit may be brought into operative relation with respect to any series of punches in the punch die block. When such adjustment has been achieved, the accumulator unit may be fixed in position by means of clamps 228 which overhang the upper free face of the accumulator unit face 230.

As intimated hereinabove, the punch control unit is designed to control a selected number of punches 158. This implies, therefore, that the punches exceed in number the interposing rods 164. Specifically, there has been embodied herein three hundred and twelve punches which are arranged in twelve banks of twenty-six punches to each bank. Since there has been shown herein only six sets of interposer rods, it is apparent that the automatic punch control unit is adapted to control only six of the punches in each bank. This fact renders significant the arrangement hereinabove described for adjusting the position of the punch control unit, and it is by this adjustment that any adjacent group of six punches in the respective banks may be selected for automatic control. The remaining punches of the banks may be placed under control of the manual interposer members, as will appear hereinafter.

A plurality of manually set interposer bars 232, one of which is shown in Figure 5 of the drawing, will provide for the control of punches that are not under the control of the accumulator unit interposer bars. Thus, if a hole or a series of holes are to be repeatedly punched in a plurality of cards, it is only necessary to move the indicated manual interposer slides 232 into engagement with the head of selected punches, thereby holding the punches against upward movement when the slidable punch die block 156 is raised to effect a punching operation.

*Punch control and accumulator drive*

Means for driving the ratchet wheels 186 and 188 on the end of the accumulator unit shaft 172 has been alluded to hereinabove and the mechanism involved will now be specifically described. Figures 4, 11 and 14 will be most useful to illustrate the structure involved. A pair of drive fingers 234 and 236 are adapted to have their free ends selectively placed in driving contact with the teeth of the ratchet wheels 186 and 188, respectively. Either of the drive fingers 234 or 236 may be placed into operative contact with its respective ratchet wheel. Thus, as shown in Figure 4 of the drawing, the drive finger 234 is in driving contact with the negative ratchet wheel 188, while the driving finger 236 is restrained from driving engagement with the positive ratchet wheel 186. The driving relation between the drive fingers and the ratchet wheels may be reversed from that shown in Figure 4 by removing a stop pin 238 from its indicated position and by placing it into a socket 240, whereby the driving finger 234 will be held out of contact with its associated ratchet wheel and at the same time permit the drive finger 236 to move into engagement with the teeth of the ratchet wheel 186. Obviously, it is intended that the ratchet wheels 186 and 188 be driven alternately at the option of the operator. A detent wheel 242 is fixed to the shaft 172, and in connection therewith a detent 244 is pivoted on a stud 246 for swinging movement about one end thereof. The opposite end of the detent 244 is urged by means of a spring 248 in the direction of the detent wheel 242, whereby the detent wheel engaging surface of the detent is brought into contact with the detent wheel, thereby stabilizing the rotation of the shaft 272.

The drive fingers 234 and 236 are guided for short reciprocatory movement in guide brackets 250 and 252, respectively. The drive fingers 234 and 236 extend laterally of the machine frame, where they cross at a pivot point 254, the oppositely extending ends of the fingers being interconnected by means of a spring 256, whereby their oppositely free ends are urged toward ratchet driving position.

The drive finger pivot 254 is carried at the end of one leg of an L-shaped rocking frame 258. The opposite leg of the L has a slide bearing 260 rotatably attached thereto. Intermediate its opposite ends the frame is pivoted for rocking movement on a pivot stud 262, which extends outwardly at the base of the accumulator unit. Rocking motion of the frame 258 is effective to impart a reciprocatory motion to the drive fingers 234 and 236. This rocking motion is attained by means of a driving mechanism mounted on a bracket 264 fixed to a frame member 236, on which the accumulator unit is supported. Extending rearwardly from the bracket 264 is a bearing stud 268, on which is mounted for rocking movement a yoke 270. The free end of the yoke provides an open channel 272, in which the bearing slide 260 is received, and in which the slide is adapted to move as the yoke is rocked about its bearing shaft 268. Extending downwardly from the yoke and formed integrally therewith is a drive arm 274, with which may be connected in operative relation a freely rocking cam arm 276. The lower end of the drive arm 274 has pivoted thereto an interposer 278, which has a forwardly projecting finger 280 and a rearwardly projecting finger 282. The interposer is pivotally mounted on a stud 284 projecting from the lower end of the drive arm 274. A leaf spring 286 bears against a shoulder of the forwardly projecting finger of the interposer 278 and thereby urges the interposer in a counter-clockwise direction. The rearwardly projecting finger 282 of the interposer has formed a shoulder 288 in the upper face thereof and the shoulder is adapted to make contact with an abutment 290, which is fixed to the cam arm 276. When the shoulder 288 and the abutment 290 are in contact with each other, rocking movement of the cam arm 276 imparts a similar rocking movement to the drive arm 274. The lower end of the cam arm 276 has rotatably attached thereto an accumulator cam follower 292, which, as best seen in Figure 15, is adapted to ride in the groove 294 of an accumulator cam 296. The accumulator cam 296 is fixed to the cam shaft 298, which is in driving connection with the main drive shaft 124 through gears 300 and 302, the former being fixed for rotation with the main drive shaft 124 and the latter being fixed to the accumulator cam shaft 298.

Means has been provided herein for destroying the contact between the shoulder 288 of the interposer and the abutment 290 on the cam arm in the event that no card is present in the punching station. Thereby undesired operation of the accumulating mechanism is avoided under such conditions. Disengagement of the shoulder 288 and the abutment 290 renders the drive arm 274 inoperative and permits the idle operation of the cam arm 276. Accordingly, there has been provided a card sensing finger 304, which has a free end extending upwardly through the card guide 62, a passage 306 being provided in the overhanging card guide flange 108 to permit the sensing finger to move upwardly. The sensing finger is pivotally mounted on a forwardly extending bearing stud 308 and the same is urged rotatably about the stud 308 by a spring 310, which has one end thereof attached to the finger and the other end thereof to an anchor stud 312 extending outwardly from the frame 266. Thus, the upturned end 314 of the card sensing finger is normally urged upwardly into intersecting relation with respect to the plane in which cards travel into the punching zone. The free upward movement of the sensing finger is prevented during a large part of each operative cycle by a card sensing cam 316 (Figure 4). The card sensing finger has an inturned end 318, which serves in the capacity of a cam follower in contact with the face of the cam 316. The cam 316 has a single notch 320 formed in the periphery thereof, which permits the follower end of the sensing finger to drop when in registration therewith, and as a consequence permits the upturned end 314 of the sensing finger to move upwardly. If a card overlies the card sensing hole 306, the upturned end 314 of the lever is limited in its upward movement and, therefore, the follower end 318 of the finger is not permitted to drop to the bottom of the notch 320. However, when no card is present at the card sensing hole 306, the sensing finger is permitted to rock to the fullest extent permissible by the depth of the notch 320, and such greater movement of the card sensing finger is transmitted to the interposer 278 and moves the same to an unlatched position. Specifically, the instrumentality through which the interposer is rocked to disconnected position consists of a rocking lever 322, which is pivoted substantially midway of its length on a pivot pin 324. The forward end of the lever 322 has a bifurcation 326 to provide an engagement embracing the card sensing finger 304. Movement of the card sensing finger causes the rear end 328 of the rocking lever 322 to rotate in a counter-clockwise direction in contact with the forwardly projecting finger 280 of the interposer 278. As a consequence, the rearwardly projecting finger 282 of the interposer is rotated in a clockwise direction to destroy the contact between its shoulder 288 and the abutment 290, thereby rendering idle the yoke 270. A stop pin 340 limits the clockwise movement of the drive arm 274 and a spring 342, which has one end thereof attached to the pivot stud 324 and the other end thereof to the yoke 270, tends to exert a constant tension on the yoke, which tends to move the same in a counter-clockwise direction about its bearing stud 268.

*Printing mechanism*

After the cards have been punched in the punching accumulator station 16, the card conveying mechanism advances the cards in step-by-step relation to the printing station 18, the details of which are best shown in Figures 6b, 7, 8, 18, 19 and 20. The card conveyor mechanism 14 delivers the cards to a pair of feed rollers 344 and 346. Reference to Figure 6b will perhaps provide the most particular illustration of the manner in which the card printing mechanism is disposed with reference to the machine frame. The main drive shaft 124 terminates beyond a frame bearing bracket 348 and on the end thereof is a bevel gear 350, which lies in driving contact with a bevel gear 352 attached to the cam shaft 354. The cam shaft carries a gear 356, from which power is derived for driving the printing mechanism. The train of gears through which motion is transmitted is best shown in Figure 6b, wherein it is seen that the cam shaft gear 356 is in contact with the first gear 358 of a reduction train. The gear 358 is rotatably mounted on a stud shaft 360 extending outwardly from the frame. On the stud shaft 360 is a second gear 362, the teeth of which are in contact with a larger gear 364 rotatably mounted on a stud shaft 366. The stud shaft 366 has mounted for rotation thereon a pinion 368, which is in driving contact with a gear 370. The gear 370 is mounted for rotation on a stud shaft 372 and mounted on the same shaft for rotation is a pinion 374, the teeth of which are in driving contact with the teeth of a gear 376 fixed to a rear cam shaft 378.

The gear 358 meshes with the teeth of a pinion 380, which in turn is fixed to the end of the feed roller shaft 346, and this latter pinion drives a pinion 382, which is fixed to the feed roller shaft 344. At the same time, the gear 358 is in driving contact with a gear 384 fixed to the shaft 386 of a printing platen. The platen gear 384 in turn is in driving contact with the transmission pinion 388, through which motion is transmitted to a pinion 390 fixed to the end of a lower feed roll shaft 392. An upper feed roll shaft 394 has fixed to the end thereof a driving pinion 396, which is in mesh with the pinion 390.

The feed roller pinion 390 is in driving contact with a transmission gear 398 mounted for rotation on a stud shaft 400, and the latter gear is in driving contact with a pinion 402 fixed to the end of a lower feed roller shaft 404 at the rear of the printing station. The pinion 402 in turn transmits motion to a pinion 406 fixed to the end of the upper rear feed roller shaft 408. It thus follows that the cam shaft gear 358 is effective to transmit motion through the intervening train of gears for rotating the several feed roller shafts, for imparting motion to the shaft of a printing platen roll and for operating a rear cam shaft whose purpose will be clarified as the description proceeds.

The printing unit frame 410 constitutes a support for printing and inking mechanism. The specific nature of the inking and printing mechanism is best determined by reference to Figures 7 and 8 of the drawing. The printing unit frame supports a transverse bearing shaft 412, on which is mounted a printing roller frame 414, and the frame 414 provides a support for an inking unit 416. Mounted for rotation in the printing roller frame 414 is a printing roller shaft 418, which is adapted for rotation through a gear 420 keyed to an end of the shaft and being disposed thereon in driving relation with the gear 384. The printing roller shaft 418 is journaled for rotation in opposite sides of the printing roller frame 414 (see Figure 18), and it carries thereon a printing drum 422, which is in the form of a spider 424 adapted to support a plurality of conventional numbering wheels.

By reference to Figure 8 of the drawing, it will be seen that the spider structure 424 includes a pair of oppositely disposed supporting arms 426 and 428, with which clamping devices 430 and 432 cooperate for the purpose of mounting one or more sets of numbering wheels 434. Herein have been illustrated two groups of numbering wheels 434a, which are hand-set, and a third group 434b, which are automatically advanced during the operation of the printing mechanism. The numbering wheels are mounted on a shaft 436, which has fixed to it a yoke 438 and which supports a pawl 440 (see Figure 8). The pawl 440 is spring-pressed toward peripheral transfer teeth 434c in the numbering wheel assembly. In accordance with a known construction, each numbering wheel except that of the highest order of a group is notched to allow the step-by-step indexing of a wheel and the transfer of motion between the respective orders of a numbering wheel group. It is sufficient for the purpose of this specification to know that the rocking of the yoke 438 causes the numbering wheels of the automatically controlled numbering wheel groups 434b to advance in consecutive order to transfer values from a lower to each succeeding higher order. The mechanism herein includes means for imparting regular rocking motion to the yoke 438 as the printing device operates, and such mechanism is best described with reference to Figures 8 and 18 of the drawing.

Fixed to the numbering wheel shaft 435 is a numbering wheel drive bell crank 442, which includes a pair of angularly disposed arms 444 and 446 on the ends of which are mounted rollers for engaging an eccentrically curved numbering wheel advancing arm 448. The arm 448 is mounted for free rocking motion on a shaft 450. In the normal operation the roller on the end of the arm 444 engages the eccentrically curved numbering wheel advancing arm 448, as the printing drum 422 revolves in a counter-clockwise direction. The arm 442 is brought toward the shaft 418, thereby rocking the yoke 438, stepping one or more of the numbering wheels one step forward. The roller on the arm 446 in turn engages the eccentric arm 448 and retracts the printing wheel advancing yoke 438.

The printing roller frame 414 provides a mounting for the inking unit 416. The mechanism of the inking unit is mounted in a pair of side frames 452, which are supported from a mounting base 454. The printing roller frame 414 has provided therein a pair of oppositely disposed guide grooves 456, which are adapted to receive the projecting edges of the mounting base 454 and guide the base and structure supported thereby in movement toward and away from the printing drum 422. A stop bar 458 is provided at the inner end of the guide grooves 456 for limiting the inward movement of the inking unit assembly and for positioning the inking rollers with respect to the printing face of the number wheels 434. The rear end of the guide grooves 456 are open and permit the ready withdrawal of the inking assembly from engagement with the printing unit.

In order to facilitate the adjustment of the inking unit, there is fixed to the bottom of the base plate 454 a pair of spaced racks, whose teeth extend downwardly into engagement with pinions 462, which are mounted for rotation with a transverse shaft 464 journaled for rotation at opposite ends in the printing unit frame 414. A hand wheel is provided on the shaft and its manual rotation thereby facilitates the adjustment of the inking unit with respect to the printing drum.

Fixed to the printing roller shaft 418 is a small pinion 466, which is in driving contact with a cam shaft gear 468 mounted on a stud shaft 470. Fixed to the gear 468 for rotation therewith is a pinion 472, which lies in contact with a gear 474, which drives a cam shaft 476. The inking rollers are driven from a gear 478, which is attached for rotation to the printing roller shaft 418. A stud shaft 480 carries a pinion 482 for free rotation with respect thereto, and this latter pinion is in driving contact with a second pinion 484 mounted for rotation on a stud shaft 486, the second pinion 482 being in driving contact with the gear 478. Rotary motion from the pinion 484 is transmitted to a drive pinion 488 mounted on the gear shaft 476. The pinion 488 is in driving contact with an inking roller shaft pinion 490 mounted on the end of an upper inking roller shaft 492. The pinion 488 is also in driving contact with a lower inking roller shaft pinion 494 mounted in driving relation on the end of a lower inking roller shaft 496. The inking roller shafts 492 and 496 carry steel distributing rollers 498 and 500, respectively, and in conjunction with these rollers are arranged a plurality of rubber transfer rollers 502 and rubber form rollers 504, 506 and 508.

The transfer roller 502 and the form rollers 504, 506 and 508 are removably mounted in the side frames 452 of the inking unit. Reference to Figure 20 will show a plurality of bearing sockets 510, of which only one need be described specifically. The ends of the shafts of the form rollers and the transfer roller are adapted to rest in oppositely disposed bearing sockets and each socket has associated therewith a latch device for holding the shaft in rotative position with reference to its bearing socket. A latch finger 512 has a pivot 514, about which the latch may be rotated. The operative end of the latch has an inturned lip 516, which is adapted to lie in contact with the roller shaft when the latch is in shaft retaining position. An overcenter spring 518 has one end thereof anchored on a frame stud 520 and the other end thereof on a latch stud 522. The force of the spring 524 is such as to hold the latch 512 in shaft retaining position. The latch may be rocked about its pivot 514 by manipulating the finger lever 526 to open the bearing pockets for the removal of rollers mounted therein. Since each of the latching devices is similar to each of the others, only one thereof need be specifically described.

The shafts of the transfer roller 502 and the distributing rollers 498 and 500 extend beyond the end plates 452 of the supporting frame, where they are associated with mechanism for reciprocating these rollers in an axial direction while the same rotate in contact with other rollers of the inking unit. Reference to Figures 19 and 20 will reveal the specific mechanism involved. It is understood that the roller reciprocating mechanism shown in Figures 19 and 20 is duplicated at the opposite side of the inking unit and it is, therefore, deemed sufficient to describe a single combination of operative devices herein. Accordingly, only one end has been illustrated.

The side frame 452 has extending from its outer face three oscillating arm mounting brackets 528, 530 and 532. The mounting brackets each supports one end of a rocking cam follower arm 534, 536 and 538. Each follower arm has a cam following roller 534a, 536a and 538a, respectively, at the free end thereof. The cam following rollers lie in contact with a face cam 540, which is keyed to a driven cam shaft 476. Rotation of the cam 540 will alternatingly depress and release the cam follower arms 534, 536 and 538. Each of the cam follower arms has an inwardly projecting nose 542, which bears against its respective roller shaft. It follows, therefore, that rotation of the cam 540 will move the roller shafts inwardly and the operation of identical, though rotatively reversed, combination of cam and cam followers at the opposite end of the shafts will move the rollers outwardly, thereby imparting to them a continuous reciprocating movement during the ink applying and spreading operation.

An ink supply fountain 544 is disposed at the top of the inking unit frame and this fountain consists generally in a confining receptacle having means for permitting the controlled discharge of ink therefrom. Specifically, the fountain includes a pair of end walls 546 connected by a side wall 548, which is disposed oppositely a parallel fountain roller 550, the space between the side wall 548 and the fountain roller 550 is bridged by an adjustable doctor blade 552. For the purpose of transferring ink from the fountain roller 550 to the rubber transfer roller 502, there is provided herein a doctor roller 554. The doctor roller is adapted for oscillating movement between the fountain roller and the transfer roller. Accordingly, there is provided herein a bracket 556, which is mounted for rocking movement with a rock shaft 558 that is journaled at its opposite ends in the side frames 452 of the inking unit.

As best seen in Figure 7 of the drawing, the shaft 558 has affixed thereto a rocking dog 560, which has two downwardly extending divergent legs 562 and 564, which straddle a cam 566 fixed for rotation with the cam shaft 476. Accordingly, as the cam 566 rotates alternately in contact with the legs 562 and 564, the rock shaft 558 receives continuous oscillating motion, with the result that the doctor roller 554 oscillates continuously between the fountain roller 550 and the transfer roller 502. A spring 568 stabilizes the action of the rocking dog 560 and its over-center mounting with respect to the leg 562 causes the dog to move with a positive action.

One end of the rock shaft 558 supports a pawl device 570, the drive finger of which is adapted to lie in engagement with the teeth of a drive ratchet 572 fixed to one end of the fountain roller shaft. A latch device 574 is provided for rendering the drive finger of the pawl inoperative with respect to the ratchet 572 by lifting the drive finger and holding it out of contact with the teeth of the ratchet. In its normal position, the pawl mechanism 570 is effective to index the ratchet device 572 a single step at each revolution of the printing mechanism, whereby the fountain roller 550 is slowly rotated to present a fresh supply of ink to the transfer roller 554 as the machine continues in operation.

The doctor blade 552, as usual in such structures, consists of a somewhat flexible steel strip, which may be adjusted with reference to the periphery of the fountain roller 550 by means of inwardly or outwardly adjusting one of more thumb screws 576 which are threaded in the side walls 548 of the ink supplying fountain.

It will be remembered that a card follower has been provided for disabling the accumulating mechanism of the punching station in case no card is present at that station. It is similarly the purpose herein to provide a card controlled disabling mechanism for the numbering wheel indexing device. There has, accordingly, been provided a control structure under the influence of a card entering the printing station for controlling the mechanism, which advances the numbering wheels as the cards are printed, this structure being operative to disable the indexing mechanism in the absence of a card at the entrance of the printing station. Figures 6b, 6c and 7 will best illustrate the control mechanism in question.

At the forward end of the conveyor mechanism 14 there is provided a vertically disposed card sensing finger 578 (see Figure 6b). The upper end of this card sensing finger 578 is adapted to project upwardly beyond the horizontal plane in which the cards are carried into the printing station, but an overlying card prevents the sensing finger from rising, thereby maintaining the operative relation of the parts to be described. The lower end of the card sensing finger is adapted to rest on a lever abutment 580. The abutment 580 is at one end of a lever 582 mounted on a shaft 584, which extends through the wall of a side frame member. The lever 582 may rock about the shaft 584 on which it is mounted. The lever includes an upwardly inclined arm 586, the upper end of which has an outwardly turned flange or finger 588, which intersects the plane of an upwardly projecting finger 590 formed as an extension of a bracket 592 pivoted for rocking movement about a stud 594, which projects inwardly from the side wall of the machine. The lower free end of the bracket 592 has formed thereon a flange 596 adapted to contact the lower end of a vertically reciprocating control rod 598, which is guided for reciprocating movement in a guide bracket 600.

A lever 602 is fixed to the outwardly projecting end of the shaft 584 and the lever is urged in clockwise direction by means of a spring 604, which has one end thereof anchored to a stud 606 on the face of the lever 602 and the other end thereof to a stud 608 extending from the outer face of the frame of the machine. As a consequence of the foregoing structure, it follows that the forwardly extending leg of the lever 582 is urged in a clockwise direction, and consequently, the card sensing finger 578 is projected upwardly during the card feeling part of an operative cycle. If no card is present, clockwise movement of the lever 582 is sufficient to rock the outwardly turned flange 588 thereof into contact with the upwardly projecting finger 590 of the bracket 592. Such contact, of course, swings the bracket 592 in a clockwise direction about its pivot stud 590 and carries the bracket seat 596 against the end of the control rod 598, thereby moving the rod upwardly in its guiding bracket 600 and into operative contact with a latch flange 610.

Reference to Figure 7 will show the latch flange 610 at one end of a generally L-shaped latched lever 612, which is pivoted on a pivot shaft 614. The latch 612 includes an upright arm 616, at the upper free end of which is a vertical flange 618 adapted to underlie an aligned vertical flange 620 of a control lever 622. The control lever 622 is fixed to a transverse rock shaft 450, to which the numbering wheel advancing arm 448 is attached, and from which it receives rocking motion. So long as the vertical flange 618 of the latch lever 612 underlies the aligned flanged end 620 of the control lever 622, the rock shaft 450, and consequently, the numbering wheel advancing arm 448, will be held in a counter-clockwise position, i. e., the arm 448 will be depressed into operative position with the numbering wheel drive bell crank 442 and the numbering wheels will advance regularly upon each rotation of the printing drum. If no card has entered the printing station, and as a result thereof the control rod 598 is projected upwardly, the latch lever 612 will be rotated about its pivot 614 in a clockwise direction, thereby releasing the control lever 622, allowing the rock shaft 450 to rock in a clockwise direction, thereby elevating the numbering wheel advancing arm 448 into an inoperative position. When the numbering wheel advancing arm 448 is in an inoperative position, the printing drum may rotate without any indexing effect on the numbering wheels carried in the face thereof.

In order to reset the numbering wheel advancing arm 448, there is provided herein a cam 626 fixed to the printing drum shaft 418. The cam 626 is adapted to operate in contact with a cam following roller 628 carried at the end of a downwardly extending arm 630 of the control lever 622. The control lever 622, and consequently, the rock shaft 450, is biased in a clockwise direction by means of a tension spring 632, which has one end thereof attached to the lever and the other end thereof attached to a fixed machine part. On the other hand, the lever 613 is biased in a counter-clockwise direction about the pivot shaft 614 under spring tension (not shown). Upon each rotation of the printing drum, the cam 626 is brought into operative contact with the cam follower 628 at the end of the downwardly extending arm 630 and the control lever is, therefore, rocked in a counter-clockwise direction to an extent sufficient to raise the flanged end 620 out of contact with the face of the latch lever flange 618. If thereupon a card is present at the entrance of the printing unit, the control rod 598 will be lowered and the latch lever 612 will rock in a counter-clockwise direction to engage the flange 618 thereof under the aligned flange 620 of the control lever 622. This movement is effective to rock the printing wheel advancing arm 448 in a counter-clockwise direction, thereby lowering the same into operative relation with the numbering wheel drive bell crank 442 for restoring the normal indexing movement of the numbering wheels.

The mechanism of the card sensing system is under the control of a cam 634 mounted for rotation with the cam shaft 354 (Figure 6a). Mounted on a bearing shaft 636 is a cam follower, which has on one arm thereof a roller 638 adapted to ride in the groove of the cam 634. An upwardly extending arm 640 of the follower mounts a forwardly extending crank shaft 642. The forward end of the crank shaft 642 is pivoted on a plate 644, which is mounted for rocking movement on a stud shaft 646. A rearwardly extending arm 648 of the plate 644 is in contact with a depending cam lever 650, the lever being pivoted for rocking movement on a pin 652. The depending cam lever 650 has a rearwardly projecting ear 654, which provides a support for the lever 602. When the cam 634 is rotating, the operating shaft 642 will be reciprocated and consequently, rock the plate 644 about its stud shaft mounting 646. As the plate 644 is rocked in a clockwise direction, the rearwardly projecting arm 648 moves along the cam surface of the depending lever 650. The ear 654 is held without substantial movement until the cam follower 648 reaches the notch 656 in the depending cam lever. At this time the cam lever will rock in a counter-clockwise direction, with the result that the support of the ear 654 will be withdrawn from the lever 602. At such time the lever 602 will be rotated in a clockwise direction under the influence of the spring 604 unless a card is at the printing station in overlying relation to the rod 578. In case no card is present, the before-described sequence affecting the advance of the numbering wheels takes place.

*Card counting and stacking*

There is included herein a card counting mechanism, which is under the control of the rocking plate 644. Mounted on an upstanding frame part 658 at a point to the rear of the last pair of feed rollers 402 and 406 are a plurality of numbering wheels 660. These wheels are adapted to be rotated about a shaft 662 for counting the cards that have been processed at the punching and printing stations. The shaft 662 also supports a yoke 664, with which is assembled a numbering wheel detent 666, which is effective upon rocking movement of the yoke 664 to engage and rotate the numbering wheels in step-by-step relation and to transfer rotary motion between wheels for transferring values of lower order to each successive higher order. The counter is of conventional structure and a detailed description thereof is deemed unnecessary. It is sufficient herein to describe how the counter is specifically combined with the machine for performing its intended function. The yoke 664 includes a laterally projecting arm 668, in which is fixed a pin 670, and to which is pivotally mounted an operating bar 672. The pin 670 constitutes an anchor for one end of a spring 674, the spring having its other end fixed to an anchor stud 676. It is manifest, therefore, that the spring 674 tends to rotate the arm 668 and its associated yoke 664 in a counter-clockwise direction, which is effective to position the numbering wheel detent 666 for rotation of an associated numbering wheel or numbering wheels on the return stroke of the operating bar 672. Reference will now be made to the manner in which the operating bar 672 is actuated.

A linkage system (Figure 6c) is disposed between and connects the plate 644 and the operating bar 672, whereby movement of the plate is transmitted to the operating bar. Herein the linkage system is illustrated as consisting of a lever 678, which has one end thereof pivoted to the plate 644 by means of a pivot pin 680. The upper end of the lever 678 is pivoted to an angularly disposed link 682 by means of a pivot pin 684. The link 682 is mounted on a frame stud 686 for rocking movement thereon. The link 682 includes a lip 688, which projects rearwardly beyond the pivot point 684, constituting an actuating member. The actuating lip 688 is adapted to engage a shoulder 690, which is formed in one edge of the operating bar 672. Engagement between the actuating lip 688 and the shoulder 690 is normally established when the bar 672 hangs in a normally vertical position. It will be shown hereinafter that means has been provided for moving the bar out of its normal vertical position to disable the counting mechanism upon failure of regular passage of a card through the printing station.

When the link 682 is rocked in a counter-clockwise direction and the actuating lip 688 thereof engages the shoulder 690 of the operating bar 672, the operating bar 672 moves upwardly and rocks the yoke 664 on an operative stroke against the tension of the spring 674. This is the manner in which the numbering wheels 660 are advanced in step-by-step fashion to count the cards passing through the printing station. In order that a safeguard be provided against the possibility of operating the counters 660 upon failure of regular passage of a card through the printing station, there is provided a control mechanism responsive to the operation of the card controlled lever 602. The counter bar 672 has a guide slot 692 in which operates a slot follower 694, which is carried on one arm of a plate 696 pivoted for rocking movement on a frame stud 698. Pivoted to an angularly disposed extension 700 of the plate 696 is a contact finger 702. The contact finger 702 is urged in a clockwise direction by a spring 704, which has one end thereof anchored in an upwardly extending ear 706 formed as a part of the contact finger 702 and the other end thereof in an anchor stud 708, which extends outwardly from the rear face of the plate 696. As a result, the contact finger 702 is normally held in an elevated position. The numbering wheel bar 672 is mounted on an arm 668 with sufficient clearance to permit the bar to rock slightly in a vertical plane. The rocking movement permitted is sufficient to withdraw the shoulder 690 from the operating zone of the flange 688. Depression of the contact finger 702 and the resultant rocking of the plate 696 is effective to swing the operating bar 672 for the purpose of moving the shoulder 690 out of the operative zone of the plate 688. In order that the numbering wheel bar may be rocked in this manner, the contact finger 702 has provided at the free end thereof a face 710, which underlies an extension 712 of the card controlled lever 602. The face 710 and the extension 712 are spaced from each other sufficiently that the normal limited rocking of the lever 602 is ineffective to rock the contact finger 702 and the numbering wheel bar 672 ultimately controlled thereby. However, upon full movement of the lever 602, which occurs only when a card is absent at the card sensing station, the extension 712 abuts the face 710 and rocks the lever 696 about its pivot 698 to its limit position against a stud 714. Release of the contact finger 702 permits the numbering wheel operating bar 672 to return to its normal position, where it remains in operative relation with its drive mechanism until the absence of another card is detected.

As cards are discharged from the printing station, they are delivered to an elevator 716 constituting the bottom of a card receiver or rack 718 (Figures 9, 17 and 21). The cards pass from the platen of the printing mechanism through the first set of rear feed rollers 392a and 394a and through a card guide grid 720, from where they are discharged by the second set of rear feed rollers 404a and 408a into the card rack 718. In order that the cards accumulating in the card rack 718 may be evenly stacked, there is provided in conjunction with the card rack 718 card evening devices 722 and 724. Device 722 consists of a transverse bar, which is adapted to move up and down at the discharge side of the feed rollers 404a and 408a to assure that the trailing end of a card passes into the rack 718. The bar 722 is affixed at its ends to the ends of levers 722a keyed to an oscillating transverse shaft 726. One end of shaft 726 has attached thereto a card aligner operating arm 728. The arm 728 extends downwardly into the operative orbit of the lever 678. The lever 678 has formed therein a cam face 730, against which rests a follower 732 carried at the end of the lever 728. As the lever 678 is rocked, shaft 726 will be oscillated, with the result that the card aligning bar 722 is operated. Attached to the transverse shafts 726 are a plurality of aligning fingers 734, which rock with the shaft to align the card in a transverse direction. The aligning lever 724 is mounted to swing on a supporting pin 736, and such swinging movement is achieved by an actuator 738 mounted on the lever 722a and extending into engagement with to the mounting bracket of the lever 724, whereby the aligning member 724 is oscillated back and forth with periodic regularity.

The cards issuing from the feed rollers 404a and 408a are stacked in groups of predetermined numbers on the elevator platform 716, and stacking of such cards is under the control of the counter wheel assembly. As will appear from the following description, a shutter 740 (Figures 6c and 17a) is supported on the upper end of a shutter shaft 742, the shaft being supported for oscillating movement in suitable frame bearings 743a and 743b. The shutter is swung in a counter-clockwise direction under the influence of a spring 745, so that its normal position is over the cards on the card elevator platform. During the stacking of cards on the elevator platform, the shutter 740 is latched in a retracted position. The shutter shaft 742 is rocked in a clockwise direction to retract the shutter and the shaft is latched in such retracted position by means of a latched lever 744 fixed to the lower end of the shutter shaft. The latch lever 744 is adapted to engage behind a flange 746, which projects into the path of the latch lever, and which is pivoted on a stud 748 for rocking movement thereabout. It will be noted that the end 744a of the latch lever 744 is twisted to provide a cam surface, whereby movement of the twisted end of the lever through the normal plane of the latch flange 746 will turn the flange about its pivot 748 as the latch lever passes. When the lever passes beyond the latch flange, the flange is retracted into latching position behind the lever by means of a spring 750. A stud 752 limits the downward movement of the latch flange 746.

The latch 746 is under the control of a counter actuated release linkage, best illustrated in Figures 17 and 17a of the drawing. The numbering wheels 660 are recessed between the number thereon for the purpose of selectively receiving a release pin adapted to extend outwardly in a radial direction. A release lever 754 is positioned adjacent the numbering wheels 660, the same being mounted for axial adjustment and rocking movement on a shaft 756. Because of the axial adjustability of the release lever 754, it is possible to position the lever with reference to any selected one of the numbering wheels, in order to bring the free end of the release lever into the path of a prepositioned release pin. Thus, when a release pin comes into contact with the free end of the release lever 754, the lever is rocked thereby in a clockwise direction and the motion thereof is transmitted to a shaft 758, on which is secured a shift lever 760, the lower end of which is in contact with a collar 762 carried by a sliding rod 764 mounted in the spaced flanges 766 of the latch 746.

The sliding rod 764 is normally urged to the right in Figure 17 by means of a spring 768, which is coiled about the rod and bears at its one end against the flange 766 and at its other end against a collar 770 that is fixed to the rod. In order to temporarily maintain the sliding rod in its shifted or left-hand position, there is provided on the shaft 772 of the latch flange 746 a rod latching device 774. The rod latch 774 is urged about its supporting shaft in a clockwise direction by means of a spring 776, so that the tendency of the rod latch is to move in that direction unless restrained from doing so. Herein the collar 762 constitutes the rod latch restraint. The collar lies in contact with an ear 774a of the latch and holds it in a depressed position against the tension of the spring. When, however, the shift lever 760 moves the rod 764 to its left-hand position, the latch ear 774a springs upwardly behind the collar 762 and prevents movement of the collar toward the right until the rod latch 774 has been restored to its original position.

When the sliding rod 776 has been moved into the left-hand position, the projecting end 764a thereof will lie in the path of a shoulder 778 formed in the adjacent surface of the link 682. Upon rocking motion of the link 682, the shoulder 778 will abut the extending end 764a of the latch rod and will rock the latch on its pivot 748, thereby withdrawing the flange thereof out of contact with the latch lever 744. This release sets in motion the card shutter and clutches the cam shaft 378 for rotation, as will appear more directly from the following.

The cam shaft 378 has thereon a one revolution clutch 780, which is adapted to be clutched into operative relation with the cam shaft by means of a pawl 782, which is pivoted by means of a pivot pin 784 to a clutch plate 786. The clutch plate 786 in turn is fixed to the rear cam shaft and thereby rotation is transmitted to the shaft when the clutch device is in operation. The pawl 782 is normally urged toward the teeth of the clutch 780 by a spring 788, and such a spring is effective for its purpose upon release of a clutch latch 790. The clutch latch is pivoted for rocking movement on a pivot shaft 792 and the same is urged toward the clutch mechanism by means of a spring 790a. The clutch latch 790 includes an abutment surface 794 adapted to lie in the path of a rearwardly extending arm 796 of the pawl 782. As a consequence, the clutch latch is effective to swing the clutch pawl into inoperative position when the rearwardly extending arm 796 abuts the abutment surface 794 of the latch structure. Rotary movement of the clutch plate and of the rear cam shaft is impossible thereafter until the clutch latch is withdrawn to permit the pawl to move into contact with the clutch teeth for another revolution of the clutch plate and cam shaft.

The withdrawal of the clutch latch 790 is accomplished by the opposite end 744b of the latch lever 744 mounted on the lower end of the shutter shaft. The latch lever 744 has a downwardly turned flange 798, which is angularly disposed on the end of the lever to constitute a cam surface. The downwardly turned flange of the lever 744 is adapted to operate a rearwardly upturned part 800 of the clutch latch 790. It will appear, therefore, that upon release of the latch lever 744, the shutter 740 is immediately carried into the card rack 718 in overlying position with reference to cards that may have been deposited on the elevator platform 716. Further deposit of cards on such pile is, therefore, prevented. A further result of operation of the latch lever 744 is the release of the pawl 782 from the restraint of the clutch latch 790, thereby permitting the spring 788 to project the pawl 782 into contact with the clutch teeth 780. Thereby the clutch plate 786 and the rear cam shaft 378 are placed under rotation.

Since the lever 682 is swinging upon its pivot 686 without effect on the sliding rod 764, the next operation in point of time is the restoration of the sliding rod 764 to its original right-hand position, thereby restoring the latching mechanism for again latching the latch lever 744 at a later point in the cycle. The rod 764 is restored under the influence of the restoring spring 768 upon withdrawal of the flange finger 774a from behind the collar 762. Such withdrawal is accomplished when a restoring pawl 802 moves into contact with the ear 774b of the rod latch. Such restoration takes place upon the next succeeding operation of the link 682. As the link rocks in a clockwise direction, the restoring pawl 802 moves into contact with the ear 774b and moves the whole rod latch 774 in a counterclockwise direction against the influence of the spring 776. As soon as the finger 774a has been withdrawn from behind the collar 762, the rod 764 moves to the right and the whole latching mechanism is, therefore, reconditioned.

When the cam shaft 378 is rotated, an elevator cam 804 (Figure 21a) first becomes effective to lower the elevator 716 into the operative zone of a conveyor mechanism. The elevator 716 is guided in its reciprocatory movement by a pair of oppositely disposed guide members 806, which include a groove 808, into which laterally extending flanges of the elevator extend. The elevator is supported on a shaft 810, which extends through the base of the machine, and which is supported in its lower end by a pair of springs 812 anchored at one end to a shaft bracket 814 and at the other end to anchor studs 816. The elevator shaft 810 is guided for movement by a pair of oppositely disposed guide rollers 818 supported on the free end of a guide bracket 820. It follows, therefore, that the elevator 716 is spring loaded and the same may yield under the weight of cards disposed thereon. Operative means has, moreover, been provided for actuating the elevator 716, and such means is operative in conjunction with the elevator cam 804.

A cam arm 822 is pivoted for movement about a supporting shaft 824 and the free end thereof is attached to the elevator shaft 810 by means of a pin and slot connection 826. Movement of the elevator cam arm 822 is under the control of the elevator cam 804 through the interposition of an elevator cam follower 828. The elevator cam follower 828 is mounted for rocking movement about a bearing shaft 830 and the follower includes an upwardly extending arm 832, which carries a roller 834, and which roller lies in contact with a cam finger 836 of the cam arm 822. The elevator cam 804 is first effective to depress the cam arm 822 sufficiently to place the platform 716 under the plane of a pair of conveyor belts 838, and the contour of the elevator cam assembly is such as to hold the elevator in its depressed or discharged position until the conveyor structure has been operated to move a deposited stack of cards out of the zone of elevator operation.

Following the functional operation of the elevator device, a conveyor cam 840 becomes operative to rock a conveyor sector 842 (Figure 6c). The conveyor sector is mounted for rocking movement on the bearing shaft 830 and the same includes an arm which extends rearwardly to a point behind the cam shaft 378 and then forwardly and upwardly, where its upper free end carries a conveyor cam follower 844. An intermediate portion of the conveyor sector is provided with a second cam follower 846. The conveyor cam 840 is adapted to rock the conveyor sector 842 about the shaft 830 to intermittently operate a conveyor or off-take mechanism, which is now to be described.

Off-take conveyor

Supported from the machine base is a conveyor frame 848, on which is supported a pair of conveyor sills 850, on opposite ends of which are mounted pulleys 852 for operatively supporting the conveyor belts 838. The pulleys at the rear of the conveyor are mounted for rotation with one shaft 856. The shaft 856 has attached thereto a clutch device consisting of a clutch pinion 858 and a notched disc 860, both adapted for free rotation. A spring pressed clutch dog 862 is carried by one of the pulleys 852 in operative relation to the notched clutch plate 860. The conveyor sills 850 support a plurality of spaced rollers 864, on which the conveyor belts 838 are adapted to rest. The conveyor belts 838 are of the endless kind, which are trained about the end pulleys 852 of the conveyor assembly.

It is evident that rotation of the clutch pinion 858 herein in a counter-clockwise direction will operate to advance the conveyor belts 838, and in this respect it is noted that the clutch dog 862 operatively engages the notch in the plate 860 only in counter-clockwise rotative movement. In other words, when the pinion 858 is rotated in a clockwise direction, the same rotates freely on the shaft 856 without operative effect on the conveyor pulleys. The conveyor sector 842 has a tooth face, which is in driving contact with the clutch pinion 858. The relation of the conveyor cam 840 to the elevator cam 804 is such that the elevator is depressed and held in such depressed position prior to the operation of the conveyor. Upon depression of the elevator, the conveyor cam becomes effective to move a stack of cards out of the operative zone of the elevator platform 716, and it is only after the conveyor cam has completed its operative movement that the elevator cam permits the elevator to rise again to its upper position under the influence of the springs 812.

In the meanwhile, a shutter cam 868 is conditioned to rotate the shutter shaft 742 into a retracted clockwise direction upon return of the elevator to its card receiving position. The high point of the shutter cam 868 is adapted to bear against a cam roller 870, which is carried by a shutter lever 872, the same being pivoted on the bearing shaft 830. The upper end of the shutter lever 872 is joined to a shutter operating link 874, which in turn has a pivotal connection with the latch lever 744. Immediately after the elevator has returned to its card receiving position, the high point of the shutter cam 868 will ride in contact with the cam roller 870, thereby swinging the shutter lever 872 in a counterclockwise direction about the bearing shaft 830. This movement will serve to operate the shutter operating link with consequent rocking of the shutter shaft and its attached latch lever 744. At the extreme of the shutter lever movement, the one end of the latch lever 744 will again engage behind the shutter latching structure 746 and the other end will release the clutch latch 790, permitting the same to return to clutch pawl engaging position. Upon the return of the clutch pawl 782 into contact with the pawl latch 794, the clutch mechanism of the shaft 378 is disabled and the whole mechanism is again reconditioned for a subsequent cycle of operation.

Machine control

The motor circuit is completed by virtue of electric current passing from the plus side of a 110 v. D. C. supply through a master switch MS (see Figure 30), through 12 amp. fuse F, to a brake contact BC, which is manually closed at the time the start key SK contact is manually closed by the operator in starting the machine. The circuit is then through the start key contact, through relay coils R1 and R2, through the other leg of the master switch and out the minus side of the supply line. Energization of the relays R1 and R2 closes the relay points R1a and R2a, respectively, in a circuit through the motor. Current through the motor comes from plus side of the line, the master switch, and the 12 amp. fuse. A third relay R3 is picked up at the time start key SK is depressed and a circuit to hold this relay energized is completed through a hopper contact HC, a series of jam contacts JC (only three being shown in Figure 30), a stop key contact SW and the points R3a of the relay R3, now closed. This last circuit permits the machine to continue to run until such time as one of the contacts should open and break the circuit or if the stop key SW should be depressed. A shunt circuit around the jam contacts and under the control of a circuit breaker cam and contact CB1 prevents the machine from stopping while the jam contacts JC are opened by the presence of cards passing in proper sequence. Should a card fail to move from its last station due to a jam or other machine failure, the jam contact affected thereby will be held open by virtue of the presence of such card, and such open jam contact will then open the holding circuit when the circuit breaker CBI comes to its open position in its normal cycle. The brake contact BC, which is manually closed when starting the machine becomes electrically controlled when the machine is under motion by virtue of a circuit being completed through the brake solenoid BS and the points of the R1 relay. Since all relay points are restored to normal when the machine stops, it is necessary to manually close the brake contact whenever starting the machine.

Figure 2b shows the control elements for the electrical circuit to be located at the rear or hopper end of the machine. Herein the master switch MS is mounted on a frame pedestal, while the start key SK and the stop switch SW are both mounted on the machine base 10. In proximity to the control switches is a brake operating lever 876, which extends laterally into engagement with mechanism controlling the brake contact BC and the brake solenoid BS. This mechanism is best shown in Figure 3 of the drawing, to which further reference is made in connection with the description of brake mechanism adapted to halt machine movement promptly upon failure of current to the driving motor. The main drive shaft 124 has fixed thereto a brake drum 878, against the face of which a flexible brake band 880 is adapted to bear. One end of the brake band 880 is attached to an anchor lever 882, and the other end thereof is attached to a toggle lever 884. The toggle lever 884 has a laterally projecting arm 886, which is operatively connected to the core 888 of the brake solenoid BS, the connection being effected by means of a pin 890, which is carried by the solenoid and which engages the forked free end of the laterally extending lever 886. When the solenoid BS is energized and the core 888 is drawn inwardly, the toggle lever 884 will be rotated in a clockwise direction about a pivot point 892, thereby relieving tension on the brake band 880 and allowing the brake drum 878 to rotate freely. The toggle lever 886 is urged downwardly, i. e., the toggle end thereof is urged in a counterclockwise direction by means of a spring 894, which has one end thereof anchored on a lever stud 896 and the other end thereof on a frame stud 898. It will be evident, therefore, that when the solenoid BS is deenergized and the core 888 is permitted to drop, the spring 894 will pull the lever 886 downwardly, thereby swinging the toggle end 884 in a counterclockwise direction, thus applying force to the brake band 880, clamping the same tightly about the brake drum 878, thereby preventing the free rotation of the main drive shaft 124.

The control lever 876 is provided for manually restoring the brake contact BC, for raising the core 886 into the deenergized brake solenoid BS, and for releasing the grip of the brake band 880 on the face of the brake drum 878. The specific mechanism for achieving this result consists mainly in a rock plate mechanism 900, which is pivoted for rocking motion about a pivot stud 902, which extends from an adjacent transverse frame member. The rock plate 900 has four angularly disposed fingers 904, 906, 908 and 910. The brake reset rod 876 has its inner end connected with the downwardly extending finger 910 of the rock plate, whereby the plate is conditioned for rocking movement about the pivot stud 902 upon manual manipulation of the operating rod 876. The solenoid core 888 passes through a core plate 912, and this plate is pivoted on a transverse machine frame stud 914, so that it may rise and fall with the reciprocation of the solenoid core 888. The core passes through an oblong aperture in the core plate 912 and slightly below the plate 912 is a core collar 914, which is adapted to abut the lower face of the plate 912 and swing the same about its pivot 914 when the solenoid BS is energized and the core 888 is drawn into the same. The finger 908 of the rock plate 900 extends transversely into the vertical plane in which the solenoid core 888 reciprocates. The upwardly extending finger 904 of the plate is adapted to contact a switch operating element 916 when the plate 900 is rocked in a counterclockwise direction. The finger 906, which extends outwardly from the plate 900 at a point between the angularly disposed fingers 904 and 908, constitutes a stop adapted to abut a pin 918 extending into the path thereof to limit the counter-clockwise movement of the rocking plate.

With the foregoing in mind, it can be readily perceived that reciprocation of the operating rod 876 is effective to release the tension of the brake band 880, contact between the finger 908 and the solenoid core 888 is effective to raise the core into the solenoid to at least a limited extent, and contact between the upwardly disposed plate finger 904 and the switch operating member 916 is effective to close the brake contact BC. When the operating rod 876 is moved inwardly, the relationship shown in Figure 3 of the drawing prevails, thus being substantially that described immediately hereinabove. It is to be noted under these conditions that the solenoid plate 912 lies with its free end in abutting relation with the upstanding finger 904 of the rocking plate, thereby holding the rocking plate in its adjusted position. This is the position that will be maintained until the solenoid BS is energized and the core thereof further withdrawn into the solenoid. Upon attainment of this latter condition, the plate 912 will be further elevated by contact with the core collar 914, and the free end thereof will be withdrawn from contact with the upstanding finger 904 of the rocking plate. In this event, the brake contact is opened, but in the meanwhile, a holding circuit, as hereinbefore described, has been established. Upon deenergization of the brake solenoid BS, the core 888 will drop down into a position whereby the spring 894 becomes effective to again pull the brake band 888 into tight frictional contact with the brake drum 878, thereby promptly halting rotation of the main drive shaft 124.

*Operation*

When the hand lever 876 is actuated by the operator, the brake contact BC is closed, the solenoid 888 is partially lifted into the brake solenoid BS, and the brake band 880 is released, thus conditioning the machine for an operating cycle. When the operator depresses the start key SK, a circuit is made through the start key contact, through the relay coils R1 and R2, through one leg of the master switch and to the negative side of the supply line. Energization of relays R1 and R2 closes the relay points R1a and R2a in a circuit through the motor. Current from the positive side of the line flows through the master switch to the motor. A third relay R3 is picked up at the time the start key SK is depressed, and a circuit to hold this relay energization is completed through the hopper contact HC, a series of jam contacts JC, a stop key contact SW, and the points R3a of the relay R3. This circuit then energizes the motor 182, which drives the main drive shaft 124. The cam gear shaft 44 is consequently rotated and the card carriage arm 42 is oscillated, thereby reciprocating the rails 36 and 38 of the card carriage structure. At the same time the counter shaft 142 is being driven and through the associated worm gears the feed rollers 22 and 24 are rotated, thereby delivering cards from the bottom of the stack in the card hopper 12 to the rear end of the card carriage structure. As the card carriage is reciprocated, the card engaging fingers 46 thereon advance the cards in step-by-step relation toward the serial punching station 16.

Since the accumulator cam shaft 298 is being driven continuously, the accumulator cam 296 constantly oscillates the cam arm 276, but as no card is present at the card sensing aperture 306, the card sensing arm 304 is free to rise. Consequently, the connection between the cam arm 276 and the yoke 270 is broken and the yoke is unaffected by the oscillation of the cam arm. Operation of the accumulating mechanism in the punching station is thereby avoided in the absence of a card at the entrance thereof. When a card reaches the entrance to the punching station, the card sensing finger 304 is inhibited against rising by virtue of its contact with a card, and as a result thereof the interposer 278 establishes a connection between the cam arm 276 and the yoke 270. When a connection is established between the cam arm 276 and the yoke 270, the yoke is oscillated and motion is imparted to the accumulating mechanism of the punching station. Such operation continues during the normal passage of cards into the punching unit.

The cam shaft 354, from which the punch die operating frame 160 is reciprocated, is in continuous motion, and when a card is at rest within the punch die block 156, the dies will cause the indicated holes to be punched in the card in accordance with the particular series of dies 158, which are inhibited against rising by their associated blocked interposer rods 164–180, the interposer levers 166 being blocked in serial order by the pegs 170 on the respective accumulator shafts 172 as they are rotated in step-by-step relation by reciprocation of either drive finger 234 or 236.

If a card should fail to present itself at the entrance to the punching unit, the accumulator mechanism associated with the unit will be rendered inactive by dropping the interposer 278 when the card sensing finger 304 rises above the normal plane of card travel. This disconnected condition between the lever 276 and the yoke 270 will prevail until the card sensing finger 304 is again inhibited against rising above the plane in which the cards enter the punching unit.

From the punching unit the cards are advanced by the conveyor structure and they enter the serial number printing mechanism 18. The printing roller shaft 418 is continuously rotated and is thereby conditioned for the printing of numbers on the cards as they pass over the rubber platen carried by platen shaft 386. The feed of cards into the printing zones takes place between feed rollers 344 and 346. The numbering wheels carried by the printing drum 422 are indexed in step-by-step order as the bell crank 442 rides in contact with the numbering wheel advancing arm 448, thereby conditioning the numbering wheels for the printing of serial numbers on the cards as they pass in order through the printing station. As long as the card sensing finger 578 at the entrance to the printing station is inhibited from rising above the plane in which the cards enter the station by the presence of a card over the end thereof, the numbering wheel advancing arm 448 will remain in its depressed position, which is its operative position with respect to the numbering wheel advancing yoke. In the absence of a card at the entrance of the printing unit, the sensing finger 578 is permitted to rise, thereby rocking the lever 582 and projecting upwardly the control rod 593. The upward movement of the control rod 598 causes the latch flange 610 to be displaced and this in turn withdraws the flange 618 from under the flanged end 620 of the control lever 622. When the control lever 622 is rocked about its pivot by means of the spring 632, the cam 448 is elevated and thereby the numbering wheel yoke is rendered ineffective to advance the numbering wheels. Upon discharge from the printing station, the cards travel between the rear feed rollers 392a, 394a, the card guides 720, and the forward feed rollers which are driven by pinions 402 and 406.

The cards are discharged to the platform 716 of the card elevator, and in the process of passing from the printing station the cards are counted by the number wheels 660, these wheels being driven through the constantly operating shaft 642, the rock plate 644, the lever 678, the operating bar 672, and the yoke 664. Normal transfer of values between orders represented by the wheels takes place in a conventional manner. The wheels 660 of the counter assembly continue to register the cards being discharged to the elevator platform so long as the operating bar 672 is permitted to hang substantially vertically and thereby establish contact between the lever 682 and the shoulder 690 of the bar. This position of the operating bar is normal and maintains so long as cards are passing through the printing station in normal step-by-step order. However, upon failure of normal card passage, the lever 682, which is controlled ultimately by the card sensing lever 578 will then be permitted to drop under the influence of the spring 604 and through the intervening linkage, the operating bar 672 will be tilted out of its vertical alignment and the shoulder 690 thereof will be withdrawn from the operating zone of its associated actuating lever, with the result that the number wheel advancing mechanism is disabled.

The number of cards to be deposited on the elevator 716 is determined by prepositioning a radially extending pin in the face of any one of the number wheels. As the radially extending pin rotates, it eventually comes in contact with a release lever 754, which is effective to rock the latch release lever 760, thereby releasing a spring biased shutter 740, which then springs into overlying position with respect to the cards on the card receiving elevator. Further discharge of cards from the printing station will be received by the shutter until the elevator mechanism has performed its intended function and has again returned to its elevated card receiving position.

The release of the shutter 740, which is horizontally positioned at the upper end of the shutter shaft 742, is also effective to render operative the cam shaft 378 by releasing the one revolution clutch device associated therewith. The downturned cam flange 798 on the rearwardly extending arm 744b at the lower end of the shutter shaft 742 is adapted to contact and swing an upturned part 830 formed at the free end of the clutch latch 790. When the clutch latch 790 is rocked about its pivot shaft 792, the pawl 782 carried by the cam plate 786 is permitted to drop into contact with the teeth of the clutch 780, thereby operatively connecting the cam shaft 378 with its source of power and thereby rotating the elevator cam 804, the conveyor cam 840 and the shutter cam 868. The elevator cam 804 is first effective to lower the elevator platform 716 through the instrumentality of the elevator cam arm 822, the elevator platform 716 being lowered to a point below the flights of the endless conveyor belts 854, thereby depositing the cards on the conveyor belts. The elevator cam 804 is so shaped as to hold the elevator platform in depressed position until the conveyor cam 840 operates to advance the conveyor belts 854. This latter function follows when the conveyor sector 842 is rotated in contact with the one-way clutch device 858, which is carried on the forward conveyor shaft 856. After the cards have been moved out of the operative zone of the elevator, the elevator cam 804 again releases the elevator, whereupon it again rises to its card receiving position. As the elevator approaches its upper limit of movement, the shutter cam 868 will retract the shutter 740, depositing any cards on the shutter upon the elevator platform. The shutter is retracted against the tension of its spring through the shutter lever 872 and the shutter operating link 874, which move the shutter latch lever 744, and particularly its twisted end 744a, into contact with the latch 746, whereby the latch lever 744 is held in retracted position pending a subsequent operation of the device.

The shunt circuit around the jam contacts JC is under the control of a circuit breaker cam and contact CB1. This circuit holds closed the motor circuit, while the jam contacts JC are opened by the presence of cards passing in proper sequence. Should a card fail to move from its last station due to a jam or other machine failure, the jam contact affected thereby will be held open by such card. The open jam contact will then open the holding circuit when the circuit breaker CB1 opens the circuit in its normal cycle. The jam contact switch mechanism 104 is opened by the contact operating rod 94, which is influenced by the card jam contact levers 88. Thus, in normal operation, and when a card is in depressing relation with reference to a contact lever 88, the associated switch 104 will be opened, but the shunt circuit through the cam contact arrangement CB1 will maintain the circuit to the motor closed. The timing of the card conveyor mechanism and the cam contact device CB1 of the shunt circuit is such that the shunt circuit is open during such periods when the jam contacts are normally closed.

It follows from the foregoing, therefore, that there is provided herein a unitary machine for regularly feeding cards in step-by-step relation from a card magazine to a punching station and from such punching station to a number printing station, from which the processed cards are discharged to an off-take elevator and conveyor assembly in units of predetermined numbers. Furthermore, it is apparent that the punching unit includes means for rendering effective the punches thereof in serial order in accordance with the passage of cards into the punching station. Furthermore, it follows that the numbering wheels of the printing station are under the control of cards passing into said station, whereby the numbering wheels are serially advanced only upon entrance of a card into the station. Finally, the machine is also under the control of card movement therethrough, whereby it is rendered inoperative upon failure of the passage of cards through the several stations in regular step-by-step order.

A single operative embodiment of the machine has been shown herein for the purpose of teaching the invention. It is, however, contemplated that many changes may be made in the specific structure for carrying forward the invention which is defined in the following claims.

What is claimed is as follows:

1. In a record card processing machine, a record card magazine, a punching unit including a counter for punching serially arranged index points on a record card, means for indexing said counter in each cycle of operation, a device including indexible printing wheels and means for indexing the same in each cycle of operation for printing serial numbers on a record card, a card conveyor for sequentially advancing cards from said magazine in step-by-step relation to said punching unit and to said printing device, means for rendering inoperative said counter indexing means upon absence of a card in said punching unit, a stacking mechanism including a control register for receiving cards from said printing device and stacking the same in groups of predetermined numbers, means for indexing said control register in each cycle of operation, and means for disabling said printing wheel indexing means and said control register indexing means upon absence of a card in said printing device.

2. In a machine for processing record cards, a record card magazine, a punching unit including a counter for punching serially arranged index points on a record card, means for indexing said counter in each cycle of operation, a device including indexible printing wheels and means for indexing the same in each cycle of operation for printing serial numbers on a record card, a card conveyor for sequentially advancing cards from said magazine in step-by-step relation to said punching unit and to said printing device, means for rendering inoperative said counter indexing means upon absence of a card in said punching unit, a card sensing finger disposed in the path of advancing cards, means associated with said finger for rendering inoperative said printing wheel indexing means upon absence of a card in said punching unit, a stacking mechanism including a control register for receiving cards from said printing device and stacking the same in groups of predetermined numbers, means for indexing said control register in each cycle of operation, and means for disabling said control register upon absence of a card in said printing device.

3. In a machine for processing record cards, a record card magazine, a punching unit including a counter for punching serially arranged index points on a record card, means for indexing said counter in each cycle of operation, a device including indexible printing wheels and means for indexing the same in each cycle of operation for printing serial numbers on a record card, a card conveyor for sequentially advancing cards from said magazine in spaced step-by-step relation, means for projecting a card sensing finger into the path of a juxtaposed card, means controlled by the continued upward movement of said finger in the absence of a card for rendering inoperative said counter upon absence of a card in said punching unit, a stacking mechanism including a control register for receiving cards from said printing device and stacking the same in groups of predetermined numbers, means for indexing said control register in each cycle of operation, and a second card sensing finger for disabling said printing wheel indexing means and said control register upon absence of a card in said printing device.

4. In a record card processing machine, a record card magazine, a punching unit including a counter for punching serially arranged index points on a record card, a device including indexible printing wheels and means for indexing the same in each cycle of operation for printing serial numbers on a record card, a card conveyor for sequentially advancing cards from said magazine in step-by-step relation to said punching unit and to said printing device, means for rendering inoperative said counter indexing means upon absence of a card in said punching unit, a stacking mechanism including a control register for receiving cards from said printing device and stacking the same in groups of predetermined numbers, means for indexing said control register in each cycle of operation, means for disabling said control register indexing means in the absence of a card in said printing device, a motor for driving said punching unit, printing device, stacking mechanism and conveyor, means for feeding a record card from said magazine to said conveyor in each cycle of operation, and means associated with said conveyor for deenergizing the motor upon failure of sequential feed of cards therealong.

5. In a record card processing machine, a record card magazine, a punching unit, a printing device, a card conveyor for sequentially advancing cards from said magazine in step-by-step relation to said punching unit and to said printing device, a stacking mechanism including a control register for receiving cards from printing device and stacking the same in groups of predetermined numbers, means for indexing said control register in each cycle of operation, means for disabling said control register indexing means upon absence of a card in said printing device, a motor for driving said punching unit, printing device, stacking mechanism and conveyor, means for feeding a record card from said magazine to said conveyor in each cycle of operation, and means associated with said conveyor for deenergizing the motor upon failure of sequential feed of cards therealong.

6. In a machine for processing record cards, a record card magazine, a punching unit including a counter for punching serially arranged index points on a record card, a device including indexible printing wheels and means for indexing the same in each cycle of operation for printing serial numbers on a record card, a card conveyor for sequentially advancing cards from said magazine in step-by-step relation to said punching unit and to said printing device, a card sensing finger disposed in the path of advancing cards, means associated with said finger for rendering inoperative said indexing means upon absence of a card in said printing unit, a stacking mechanism including a control register for receiving cards from said printing device and stacking the same in groups of predetermined numbers, means for indexing said control register in each cycle of operation, means for disabling said control register indexing means upon absence of a card in said printing device, a motor for driving said punching unit, printing device, stacking mechanism and conveyor, means for feeding a card from said magazine to said conveyor in each cycle of operation, and means associated with said conveyor for deenergizing the motor upon failure of sequential feed of cards therealong.

7. In a machine for processing record cards, a record card magazine, a punching unit including a counter for punching serially arranged index points on a record card, means for indexing said counter in each cycle of operation, a device including indexible printing wheels and means for indexing the same in each cycle of operation for printing serial numbers on a record card, a card conveyor for sequentially advancing cards from said magazine in spaced step-by-step relation, means for feeding a record card from said magazine to said conveyor in each cycle of operation, means for projecting a card sensing finger into the path of a juxtaposed card, means controlled by the continued upward movement of said finger in the absence of a card for rendering inoperative said counter indexing means upon absence of a card in said punching unit, a stacking mechanism including a control register for receiving cards from said printing device and stacking the same in groups of predetermined numbers, means for indexing said control register in each cycle of operation, means for disabling said printing wheel indexing means and said control register indexing means upon absence of a card in said printing device, a motor for driving said punching unit, printing device, stacking mechanism and card conveyor, and means associated with said conveyor for deenergizing the motor upon failure of sequential feed of cards therealong.

8. In a record card processing machine, a record card magazine, a punching unit including a counter for punching serially arranged index points on a record card, means for indexing said counter in each cycle of operation, a card conveyor for sequentially advancing cards from said magazine in step-by-step relation to said punching unit, a reciprocating die block in the path of said conveyor and adapted to receive delivery of cards by a said conveyor, a plurality of reciprocal dies mounted for reciprocation in said die block, an interposer operatively associated in contact with each of said punches, means in said counter for selectively fixing said interposers against movement for fixing certain of said punches against reciprocation and thereby conditioning the same for card punching function with relation to said die, and means for rendering inoperative said counter indexing means upon absence of a card in said punching unit.

9. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register for receiving said cards from said printing device and stacking the same in groups of predetermined numbers, means for indexing said control register in each cycle of operation, and means for disabling said printing wheel indexing means and said control register indexing means upon absence of a card in said printing device.

10. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register for receiving cards from said printing device and stacking the same in groups of predetermined numbers, means for indexing said control register in each cycle of operation, a card sensing finger in the path of advancing cards, and means controlled by said finger for disabling said printing wheel indexing means and said control register indexing means upon absence of a card in said printing device.

11. In a machine for processing record cards, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register for receiving cards from said printing device and stacking the same in groups of predetermined numbers, means for indexing said control rgeister in each cycle of operation, and means for disabling said printing wheel indexing means and said control register indexing means upon absence of a card in said printing device.

12. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register for receiving cards from said printing device and stacking the same in groups of predetermined numbers, means for indexing said control register in each cycle of operation means for disabling said printing wheel indexing means and said control register indexing means upon absence of a card in said printing device, a motor for energizing said printing device, stacking mechanism and said conveyor, and means associated with said conveyor for deenergizing the motor upon failure of sequential feed of cards therealong.

13. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register and a card elevator, means for delivering cards from said printing device to said elevator in groups of predetermined numbers, means for indexing said control register in each cycle of operation, means for disabling said printing wheel indexing means and said control register indexing means upon absence of a card in said printing device, an off-take conveyor associated with said elevator for receiving cards therefrom, and means operative in response to operation of said control register for rendering said off-take conveyor operative.

14. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register and a card elevator, means for delivering cards from said printing device to said elevator in groups of predetermined numbers, means for indexing said control register in each cycle of operation, means for disabling said printing wheel indexing means and said control register indexing means upon absence of a card in said printing device, an off-take conveyor operatively associated with said elevator for receiving cards therefrom, and means operative in response to operation of said control register for rendering operative said elevator and said off-take conveyor.

15. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register and a card elevator, means for delivering cards from said printing device to said elevator in groups of predetermined numbers, means for indexing said control register in each cycle of operation, an off-take conveyor under control of said control register and operatively associated with said elevator for receiving cards therefrom, and means for disabling said printing wheel indexing means and said control register indexing means upon absence of a card in said printing device.

16. In a record card processing machine, a record card magazine, a device including indexible printing wheels and means for indexing the same in each cycle of operation for printing serial numbers on a record card, a card conveyor for sequentially advancing cards from said magazine in step-in-step relation to said printing device, means for feeding a card from said magazine to said conveyor in each cycle of operation, a stacking mechanism including a control register and a card elevator, means for delivering cards from said printing device to said elevator in groups of predetermined numbers, means for indexing said control register in each cycle of operation, said stacking mechanism including a card elevator, means interconnecting said elevator and said control register whereby said register is adapted to control the operation of said elevator, an off-take conveyor operatively associated with said elevator to receive cards therefrom, a card sensing finger in the path of cards being advanced by said card conveyor, and means controlled by said finger for disabling said printing wheel indexing means and said control register indexing means upon absence of a card in said printing device.

17. In a machine for processing record cards, a record card magazine, a device including indexible printing wheels and means for indexing the same in each cycle of operation for printing serial numbers on a record card, a card conveyor for sequentially advancing cards from said magazine in step-in-step relation to said printing device, means for feeding a card from said magazine to said conveyor in each cycle of operation, a stacking mechanism including a control register for receiving cards from said printing device and stacking the same in groups of predetermined numbers, means for indexing said control register in each cycle of operation, said stacking mechanism including a card elevator, means interconnecting said elevator and said control register whereby said register is adapted to control the operation of said elevator, an off-take conveyor operatively associated with said elevator to receive cards therefrom, and means for disabling said printing wheel indexing means and said control register indexing means upon absence of a card in said printing device.

18. In a record card processing machine, a record card magazine, a device including indexible printing wheels and means for indexing the same in each cycle of operation for printing serial numbers on a record card, a card conveyor for sequentially advancing cards from said magazine in step-by-step relation to said printing device, means for feeding a card from said magazine to said conveyor in each cycle of operation, a stacking mechanism including a control register and a card elevator, means for delivering cards from said printing device to said elevator in groups of predetermined numbers, means for indexing said control register in each cycle of operation, an off-take conveyor operatively associated with said elevator under control of said control register associated with said elevator for receiving cards therefrom, means for disabling said printing wheel indexing means and said control register indexing means upon absence of a card in said printing device, a motor for energizing said printing device, card conveyor, stacking mechanism and off-take conveyor, and card responsive means associated with said card conveyor for deenergizing the motor upon failure of sequential feed of cards therealong.

FRED M. CARROLL.

References Cited in the file of this patent

UNITED STATES PATENTS

| Number | Name | Date |
|---|---|---|
| 1,488,667 | Duncan | Apr. 1, 1924 |
| 1,885,874 | Thomas | Nov. 1, 1932 |
| 2,165,249 | Fuller | July 11, 1939 |
| 2,168,763 | Daly | Aug. 8, 1939 |
| 2,192,626 | Von Pein | Mar. 5, 1940 |
| 2,211,661 | Krell | Aug. 13, 1940 |
| 2,335,949 | Lewis | Dec. 7, 1943 |
| 2,344,345 | Elliott | Mar. 14, 1944 |
| 2,356,995 | Gollwitzer | Aug. 29, 1944 |
| 2,365,645 | Matthews | Dec. 19, 1944 |
| 2,375,241 | Lindgren | May 8, 1945 |
| 2,414,059 | Powers | Jan. 7, 1947 |
| 2,511,670 | Gollwitzer | June 13, 1950 |